US010677365B2

(12) United States Patent
Said

(10) Patent No.: US 10,677,365 B2
(45) Date of Patent: Jun. 9, 2020

(54) PRESSURE RELIEF VALVE ASSEMBLY AND METHODS

(71) Applicant: S.P.M. Flow Control, Inc., Fort Worth, TX (US)

(72) Inventor: Nuder Said, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 176 days.

(21) Appl. No.: 15/251,383

(22) Filed: Aug. 30, 2016

(65) Prior Publication Data

US 2017/0067570 A1     Mar. 9, 2017

Related U.S. Application Data

(60) Provisional application No. 62/214,691, filed on Sep. 4, 2015, provisional application No. 62/276,611, filed on Jan. 8, 2016.

(51) Int. Cl.
| | | |
|---|---|---|
| *F16K 17/16* | (2006.01) | |
| *F16K 27/00* | (2006.01) | |
| *E21B 21/10* | (2006.01) | |

(52) U.S. Cl.
CPC ............ *F16K 17/16* (2013.01); *F16K 27/00* (2013.01); *E21B 21/106* (2013.01); *F16K 17/1606* (2013.01); *F16K 17/1633* (2013.01); *Y10T 137/1692* (2015.04)

(58) Field of Classification Search
CPC ...... F16K 17/16; F16K 27/00; F16K 17/1606; F16K 17/1613; F16K 17/162; F16K 17/1626; F16K 17/1633; F16K 17/14; F16K 17/403; E21B 21/106; Y10T 137/1677; Y10T 137/1632; Y10T 137/1692–1752

USPC ......... 137/67, 68.11, 68.19–68.28; 220/89.1, 220/89.2
See application file for complete search history.

(56) References Cited

U.S. PATENT DOCUMENTS

| | | |
|---|---|---|
| 345,420 A | 7/1886 | Eskholme et al. |
| 375,464 A | 12/1887 | Thacher et al. |
| 580,226 A | 4/1897 | Sanford |
| 741,477 A | 10/1903 | Flinn |
| (Continued) | | |

FOREIGN PATENT DOCUMENTS

| | | |
|---|---|---|
| AU | 1320088 A | 9/1988 |
| AU | 649744 | 6/1994 |
| (Continued) | | |

OTHER PUBLICATIONS

"Written Opinion for Application No. PCT/US2016/37391 by ISA/US dated Sep. 9, 2016, 8 pages."

(Continued)

*Primary Examiner* — Craig J Price
(74) *Attorney, Agent, or Firm* — Wei Wei Jeang; Grable Martin Fulton PLLC

(57) ABSTRACT

According to one aspect, a pressure relief valve assembly includes a clamped rupture disc. The rupture disc is adapted to rupture when a pressure differential across the pressure relief valve assembly reaches or exceeds a predetermined pressure differential. According to another aspect, there is provided a method of retrofitting a pressure relief valve assembly. According to yet another aspect, there is provided a method of assembling a pressure relief valve assembly.

7 Claims, 17 Drawing Sheets

(56) References Cited

U.S. PATENT DOCUMENTS

| | | | |
|---|---|---|---|
| 1,022,301 A * | 4/1912 | Campbell | B63C 9/24 |
| | | | 220/583 |
| 1,030,456 A * | 6/1912 | Broadhurst | F28G 15/04 |
| | | | 116/271 |
| 1,201,022 A | 10/1916 | Conniff | |
| 1,379,092 A | 5/1921 | Fraccascia et al. | |
| 1,404,827 A * | 1/1922 | Anderson | A62C 35/605 |
| | | | 169/5 |
| 1,452,603 A | 4/1923 | Himes | |
| 1,473,634 A | 11/1923 | Loudon | |
| 1,483,001 A | 2/1924 | Kurre | |
| 1,488,211 A | 3/1924 | Loeffler | |
| 1,543,637 A | 6/1925 | Woll | |
| 1,579,141 A * | 3/1926 | Pierce | F16K 17/162 |
| | | | 220/89.2 |
| 1,607,463 A | 11/1926 | Kent | |
| 1,664,493 A | 4/1928 | Smith | |
| 1,675,808 A | 7/1928 | Kliss | |
| 1,764,936 A | 6/1930 | Dean | |
| 1,774,946 A * | 9/1930 | Rankin | H01H 33/55 |
| | | | 174/11 R |
| 1,798,498 A | 3/1931 | Riley | |
| D86,952 S | 5/1932 | Garrison | |
| 1,889,256 A | 11/1932 | Lipscomb et al. | |
| 1,990,090 A | 2/1935 | Packard | |
| 2,197,320 A | 4/1940 | Shenton | |
| 2,263,840 A * | 11/1941 | Franck | F16K 17/162 |
| | | | 116/272 |
| 2,309,856 A * | 2/1943 | Mason | F16K 17/162 |
| | | | 220/89.2 |
| 2,310,583 A | 2/1943 | Johnson | |
| 2,310,813 A | 2/1943 | Sellmeyer | |
| 2,339,287 A | 1/1944 | Neef, Jr. | |
| 2,354,161 A | 7/1944 | Waterman | |
| 2,361,881 A | 10/1944 | Sheppard | |
| 2,391,266 A | 12/1945 | Parker | |
| 2,404,142 A | 7/1946 | Parker | |
| D150,466 S | 8/1948 | Schuler | |
| 2,506,162 A | 5/1950 | Metzgar | |
| 2,526,794 A * | 10/1950 | Andrews | F16K 17/162 |
| | | | 220/89.2 |
| 2,576,431 A | 11/1951 | White | |
| 2,587,212 A | 2/1952 | Placette | |
| 2,589,144 A | 3/1952 | Russell et al. | |
| 2,606,068 A | 8/1952 | Bonacor | |
| 2,612,340 A | 9/1952 | Laurent | |
| 2,630,939 A * | 3/1953 | Jones | F16K 17/162 |
| | | | 220/89.2 |
| 2,663,458 A | 12/1953 | MacGlashan, Jr. | |
| 2,694,503 A | 11/1954 | Young et al. | |
| 2,716,506 A * | 8/1955 | Fike | F16K 17/162 |
| | | | 220/89.2 |
| 2,717,001 A | 9/1955 | Perrault | |
| 2,746,773 A | 5/1956 | Bily | |
| 2,758,749 A * | 8/1956 | Jones | F16K 17/162 |
| | | | 220/89.2 |
| 2,766,999 A | 10/1956 | Watts et al. | |
| 2,772,019 A * | 11/1956 | Jones | F16K 17/162 |
| | | | 220/89.2 |
| 2,795,459 A | 6/1957 | Cornelius | |
| 2,856,096 A * | 10/1958 | Philip | B67D 1/125 |
| | | | 220/89.2 |
| 2,923,317 A | 2/1960 | McInerney | |
| 2,925,827 A | 2/1960 | Anderson et al. | |
| 2,934,237 A * | 4/1960 | Hausen | F16K 17/162 |
| | | | 220/89.2 |
| 2,962,038 A * | 11/1960 | Bird | F16K 17/162 |
| | | | 137/614.17 |
| 2,969,492 A | 1/1961 | Wheatley | |
| 2,987,218 A * | 6/1961 | Erickson | F16K 17/162 |
| | | | 220/327 |
| 3,024,047 A | 3/1962 | Schmohl | |
| 3,060,961 A | 10/1962 | Conley | |
| 3,061,267 A | 10/1962 | Hamer | |
| 3,064,940 A | 11/1962 | Anderson et al. | |
| 3,072,379 A | 1/1963 | Hamer | |
| 3,080,091 A * | 3/1963 | Philip | F16K 17/162 |
| | | | 220/89.2 |
| 3,107,938 A * | 10/1963 | Schick | B63C 9/22 |
| | | | 102/414 |
| 3,108,939 A | 10/1963 | Sabins | |
| 3,113,792 A | 12/1963 | Brown | |
| 3,150,681 A | 9/1964 | Hansen et al. | |
| 3,160,426 A | 12/1964 | Faeser | |
| 3,194,589 A | 7/1965 | Kahlbau et al. | |
| 3,204,484 A | 9/1965 | Gustafson et al. | |
| 3,216,746 A | 11/1965 | Watts | |
| 3,228,334 A | 1/1966 | Oss | |
| 3,238,687 A | 3/1966 | Tisbo | |
| 3,241,567 A | 3/1966 | Pusch et al. | |
| 3,294,425 A | 12/1966 | Franck | |
| 3,341,232 A | 9/1967 | Deakins | |
| 3,343,802 A | 9/1967 | Schuilwerve | |
| 3,346,002 A | 10/1967 | Thompson, Jr. et al. | |
| 3,357,679 A | 12/1967 | Gulick | |
| 3,403,931 A | 10/1968 | Crain et al. | |
| 3,404,698 A | 10/1968 | Rouse | |
| 3,425,661 A | 2/1969 | Mayo | |
| 3,439,897 A | 4/1969 | Priese et al. | |
| 3,455,534 A | 7/1969 | Scaramucci | |
| 3,467,224 A | 9/1969 | Curtis et al. | |
| 3,472,479 A | 10/1969 | Sherwood | |
| 3,484,817 A * | 12/1969 | Wood | F16K 17/16 |
| | | | 220/89.2 |
| 3,554,581 A | 1/1971 | Mason et al. | |
| 3,556,474 A | 1/1971 | Scaramucci | |
| 3,561,727 A | 2/1971 | Scaramucci | |
| 3,571,896 A | 3/1971 | Wilkerson | |
| 3,594,835 A | 7/1971 | Wilson | |
| 3,599,713 A * | 8/1971 | Jenkins | E21B 21/106 |
| | | | 137/68.28 |
| 3,630,483 A | 12/1971 | Canalizo | |
| 3,680,188 A | 8/1972 | Mason et al. | |
| 3,687,415 A | 8/1972 | Turkot | |
| 3,712,585 A | 1/1973 | Grenier | |
| 3,726,314 A | 4/1973 | Moen | |
| 3,789,872 A | 2/1974 | Elliott | |
| 3,813,733 A | 6/1974 | Flohr | |
| 3,830,306 A | 8/1974 | Brown | |
| 3,834,580 A * | 9/1974 | Ludwig | F16K 17/1613 |
| | | | 220/89.2 |
| 3,840,048 A | 10/1974 | Moen | |
| 3,845,876 A | 11/1974 | Needham et al. | |
| 3,845,879 A | 11/1974 | Dernbach et al. | |
| 3,854,491 A * | 12/1974 | Bryan | B60R 21/268 |
| | | | 102/360 |
| 3,881,480 A | 5/1975 | Lafourcade | |
| 3,894,718 A | 7/1975 | Koch et al. | |
| 3,901,259 A | 8/1975 | Banbury | |
| 3,916,950 A | 11/1975 | Mongerson et al. | |
| 3,933,172 A | 1/1976 | Allen | |
| 3,934,608 A | 1/1976 | Guyton | |
| 3,937,240 A | 2/1976 | Nanny | |
| 3,942,551 A | 3/1976 | Schuller et al. | |
| 3,967,842 A | 7/1976 | Kendrick | |
| 3,972,364 A | 8/1976 | Brumm | |
| 3,974,848 A | 8/1976 | Wheatley | |
| 4,006,780 A * | 2/1977 | Zehr | A62C 35/00 |
| | | | 169/26 |
| 4,022,427 A | 5/1977 | Read | |
| 4,027,696 A | 6/1977 | Guyton | |
| 4,046,164 A | 9/1977 | Pool | |
| 4,059,872 A | 11/1977 | Delesandri | |
| 4,072,160 A * | 2/1978 | Hansen | F16K 17/1613 |
| | | | 137/68.26 |
| 4,073,402 A * | 2/1978 | Wood | F16K 17/1606 |
| | | | 137/68.26 |
| 4,085,770 A | 4/1978 | Woronowicz | |
| 4,086,803 A | 5/1978 | Wheeler | |
| 4,093,180 A | 6/1978 | Strabala | |
| 4,109,714 A | 8/1978 | Greenlee et al. | |

(56) References Cited

U.S. PATENT DOCUMENTS

| | | | |
|---|---|---|---|
| 4,113,228 A | 9/1978 | Frye | |
| 4,146,047 A | 3/1979 | Wood et al. | |
| 4,150,847 A | 4/1979 | De Cenzo | |
| 4,158,510 A | 6/1979 | Smith et al. | |
| 4,171,095 A | 10/1979 | Filan et al. | |
| 4,218,080 A | 8/1980 | Kendrick | |
| 4,221,204 A | 9/1980 | Meyer | |
| 4,254,793 A | 3/1981 | Scaramucci | |
| 4,257,528 A * | 3/1981 | Brodie | F16K 17/1606 137/68.26 |
| 4,261,387 A | 4/1981 | Cohn | |
| 4,274,434 A | 6/1981 | Haefele | |
| 4,286,621 A | 9/1981 | Glahn | |
| 4,308,916 A | 1/1982 | Fritz, Jr. | |
| 4,321,945 A | 3/1982 | Chabat-Courrede | |
| 4,327,768 A | 5/1982 | Behle | |
| 4,332,370 A | 6/1982 | Williams | |
| 4,338,707 A | 7/1982 | Byerly | |
| 4,367,571 A | 1/1983 | Speirs et al. | |
| 4,378,849 A | 4/1983 | Wilks | |
| 4,399,830 A | 8/1983 | Brodie | |
| 4,436,159 A * | 3/1984 | Revay | A62C 35/08 137/68.13 |
| 4,444,214 A * | 4/1984 | Paul, Jr. | F16K 17/16 137/315.11 |
| 4,445,255 A | 5/1984 | Olejak | |
| 4,448,148 A | 5/1984 | Gain, Jr. | |
| 4,478,388 A | 10/1984 | George | |
| 4,485,530 A | 12/1984 | Begley et al. | |
| 4,485,843 A | 12/1984 | Wolff | |
| 4,497,344 A | 2/1985 | Kisiel | |
| 4,501,291 A | 2/1985 | Siegrist | |
| 4,505,289 A * | 3/1985 | Wilson | F16K 17/162 137/315.11 |
| 4,506,696 A | 3/1985 | Von Pechmann | |
| 4,511,120 A | 4/1985 | Conley et al. | |
| 4,512,171 A * | 4/1985 | Mozley | F16K 17/1606 220/89.2 |
| 4,524,599 A | 6/1985 | Bailey | |
| 4,531,542 A | 7/1985 | Looney | |
| 4,572,237 A | 2/1986 | Thompson | |
| 4,590,957 A | 5/1986 | McFarlane | |
| 4,597,505 A | 7/1986 | Mozley et al. | |
| 4,605,036 A | 8/1986 | Smith et al. | |
| 4,616,803 A | 10/1986 | Schils | |
| 4,634,154 A | 1/1987 | Arora et al. | |
| 4,662,603 A | 5/1987 | Etheridge | |
| 4,667,570 A | 5/1987 | Jensen, Jr. et al. | |
| 4,705,306 A | 11/1987 | Guido et al. | |
| 4,716,930 A | 1/1988 | Richmond et al. | |
| 4,732,215 A | 3/1988 | Hopper | |
| 4,779,683 A * | 10/1988 | Enk | A62C 35/02 169/28 |
| 4,836,240 A | 6/1989 | Elliott | |
| 4,842,014 A | 6/1989 | Strelow et al. | |
| 4,848,398 A | 7/1989 | Leach | |
| 4,850,392 A | 7/1989 | Crump et al. | |
| 4,864,696 A | 9/1989 | Mittermaier et al. | |
| 4,896,367 A | 1/1990 | Newton et al. | |
| 4,915,418 A | 4/1990 | Palatchy | |
| 4,969,482 A | 11/1990 | Perrin et al. | |
| 4,993,489 A | 2/1991 | McLeod | |
| 5,005,722 A * | 4/1991 | Short, III | F16K 17/1606 137/68.19 |
| 5,025,865 A | 6/1991 | Caldwell et al. | |
| 5,046,525 A | 9/1991 | Powell | |
| 5,056,548 A | 10/1991 | Mills | |
| 5,143,112 A | 9/1992 | Scaramucci | |
| 5,161,566 A | 11/1992 | Scaramucci | |
| 5,161,570 A | 11/1992 | Scaramucci | |
| 5,165,478 A | 11/1992 | Wilson | |
| 5,178,185 A | 1/1993 | Stehling et al. | |
| 5,199,464 A | 4/1993 | Savard | |
| 5,307,835 A | 5/1994 | Scaramucci | |
| 5,341,840 A | 8/1994 | Manson et al. | |
| 5,355,740 A * | 10/1994 | Beaudet | B60R 21/26 280/743.1 |
| 5,386,847 A | 2/1995 | Scaramucci | |
| 5,417,402 A | 5/1995 | Speybroeck | |
| D360,728 S | 7/1995 | Nozaki | |
| 5,439,027 A | 8/1995 | Layton et al. | |
| 5,441,072 A | 8/1995 | Indey et al. | |
| 5,443,088 A | 8/1995 | Hoch et al. | |
| 5,462,413 A | 10/1995 | Schroeder | |
| 5,477,752 A | 12/1995 | West et al. | |
| 5,507,533 A | 4/1996 | Mumma | |
| 5,522,420 A | 6/1996 | Martin | |
| 5,526,883 A | 6/1996 | Breaux | |
| 5,538,296 A | 7/1996 | Horton | |
| 5,544,675 A | 8/1996 | Dean | |
| 5,584,315 A | 12/1996 | Powell | |
| 5,603,485 A | 2/1997 | Schwarz | |
| 5,676,348 A | 10/1997 | Ungchusri et al. | |
| 5,685,334 A | 11/1997 | Hagan | |
| 5,689,862 A | 11/1997 | Hayes et al. | |
| 5,755,427 A | 5/1998 | Koskinas | |
| 5,787,926 A | 8/1998 | Mukumoto et al. | |
| 5,791,693 A | 8/1998 | Crawford | |
| 5,832,947 A | 11/1998 | Niemczyk | |
| 5,947,152 A | 9/1999 | Martin et al. | |
| 5,957,592 A | 9/1999 | Yamanaka | |
| 5,971,007 A | 10/1999 | Harcourt et al. | |
| 5,983,826 A | 11/1999 | Lohde | |
| 6,003,837 A | 12/1999 | Raymond, Jr. et al. | |
| 6,029,693 A | 2/2000 | Nakanishi et al. | |
| 6,079,439 A | 6/2000 | Hartley | |
| 6,082,707 A | 7/2000 | Hosie et al. | |
| 6,085,572 A | 7/2000 | McGuire, Sr. et al. | |
| 6,089,531 A | 7/2000 | Young | |
| 6,155,091 A | 12/2000 | Hayes et al. | |
| 6,164,707 A | 12/2000 | Ungchusri et al. | |
| 6,209,561 B1 | 4/2001 | Kugelev et al. | |
| 6,230,733 B1 * | 5/2001 | Strelow | F16K 17/16 137/68.23 |
| 6,240,948 B1 * | 6/2001 | Hansen, III | F16K 17/1606 137/68.19 |
| 6,240,951 B1 | 6/2001 | Yori | |
| 6,250,605 B1 | 6/2001 | Young | |
| 6,290,237 B1 | 9/2001 | Graupner | |
| 6,298,869 B1 * | 10/2001 | Strelow | F16K 17/1606 137/68.26 |
| 6,361,051 B1 | 3/2002 | Babin | |
| 6,371,527 B1 | 4/2002 | Ungchusri et al. | |
| 6,382,247 B1 | 5/2002 | Gundry | |
| 6,387,226 B1 | 5/2002 | Persson | |
| 6,450,477 B1 | 9/2002 | Young | |
| 6,554,024 B2 | 4/2003 | Mefford et al. | |
| 6,554,249 B2 | 4/2003 | Pang et al. | |
| 6,742,538 B1 | 6/2004 | Aderholt et al. | |
| 6,752,377 B1 | 6/2004 | Taylor | |
| 6,770,177 B2 | 8/2004 | Keller et al. | |
| 6,843,265 B2 | 1/2005 | Taylor | |
| 6,848,724 B2 | 2/2005 | Kessler | |
| 6,854,704 B1 | 2/2005 | Young | |
| 6,880,567 B2 | 4/2005 | Klaver et al. | |
| 6,880,568 B1 | 4/2005 | Taylor | |
| 6,886,593 B2 | 5/2005 | Madden et al. | |
| 6,945,420 B2 * | 9/2005 | Krebill | F16K 17/1606 220/89.2 |
| 6,945,569 B1 | 9/2005 | Diaz et al. | |
| 6,948,526 B2 | 9/2005 | Seder et al. | |
| 6,954,569 B2 | 10/2005 | Yang | |
| 6,978,799 B2 * | 12/2005 | Kugelev | F16K 17/02 137/514.7 |
| 7,004,445 B2 | 2/2006 | Lymberopoulos | |
| 7,028,778 B2 | 4/2006 | Krywitsky | |
| 7,028,986 B2 | 4/2006 | Young | |
| 7,204,525 B2 | 4/2007 | Matzner | |
| RE39,695 E | 6/2007 | Ungchusri et al. | |
| 7,228,869 B2 | 6/2007 | Wilhelm | |
| D549,850 S | 8/2007 | Perlman | |
| 7,264,059 B2 | 9/2007 | Akselberg | |
| 7,285,190 B2 | 10/2007 | Martin, Jr. et al. | |

(56) References Cited

U.S. PATENT DOCUMENTS

| | | |
|---|---|---|
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,878,215 B2* | 2/2011 | McLelland ............ F16K 13/06 137/67 |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards et al. |
| D660,461 S | 5/2012 | Kotin et al. |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| 8,695,627 B2 | 4/2014 | Kugelev et al. |
| D707,332 S | 6/2014 | Witkowski et al. |
| D707,797 S | 6/2014 | Wilkowski et al. |
| 8,833,804 B2 | 9/2014 | Myers et al. |
| 8,870,233 B2 | 10/2014 | Matzner et al. |
| 8,978,695 B2 | 3/2015 | Witkowski et al. |
| 8,998,168 B2 | 4/2015 | Witkowski |
| D734,434 S | 7/2015 | Witkowski et al. |
| 9,103,448 B2 | 8/2015 | Witkowski et al. |
| 9,273,543 B2 | 3/2016 | Baca et al. |
| 9,322,243 B2 | 4/2016 | Baca et al. |
| 9,677,391 B2* | 6/2017 | Banks ..................... E21B 43/26 |
| 10,385,983 B2* | 8/2019 | Ligeti ................... F16K 17/403 |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0087232 A1 | 4/2005 | Kugelev et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0196539 A1* | 9/2006 | Raska .................... F16K 17/16 137/68.24 |
| 2006/0266422 A1 | 11/2006 | Feenstra et al. |
| 2006/0278394 A1 | 12/2006 | Stover |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0120635 A1 | 5/2009 | Neal |
| 2010/0154894 A1 | 6/2010 | Kotapish et al. |
| 2010/0193057 A1 | 8/2010 | Garner et al. |
| 2010/0258200 A1 | 10/2010 | Walker et al. |
| 2010/0288493 A1 | 11/2010 | Fielder et al. |
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0272158 A1 | 11/2011 | Neal |
| 2011/0316274 A1 | 12/2011 | Groenlund et al. |
| 2012/0025114 A1 | 2/2012 | Lymberopoulos et al. |
| 2012/0031494 A1 | 2/2012 | Lymberopoulos |
| 2012/0060929 A1 | 3/2012 | Kendrick |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181013 A1 | 7/2012 | Kajaria et al. |
| 2012/0181015 A1 | 7/2012 | Kajaria et al. |
| 2012/0181016 A1 | 7/2012 | Kajaria et al. |
| 2012/0181046 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0020519 A1 | 1/2013 | Lymberopoulos |
| 2013/0037125 A1 | 2/2013 | Drake et al. |
| 2013/0126152 A1 | 5/2013 | Banks et al. |
| 2013/0248182 A1 | 9/2013 | Chong et al. |
| 2013/0328301 A1 | 12/2013 | McGuire |
| 2015/0000766 A1 | 1/2015 | Arizpe et al. |
| 2015/0042088 A1 | 2/2015 | Witkowski et al. |
| 2015/0345646 A1 | 12/2015 | Witkowski et al. |
| 2016/0161956 A1 | 6/2016 | Baca et al. |
| 2018/0313455 A1* | 11/2018 | Said ....................... F16K 17/16 |

FOREIGN PATENT DOCUMENTS

| | | |
|---|---|---|
| AU | 348253 | 5/2013 |
| CA | 2350047 A1 | 12/2001 |
| CA | 2635751 A1 | 12/2001 |
| CA | 2636751 A1 | 1/2009 |
| CA | 2490664 C | 11/2009 |
| CA | 2485817 C | 8/2010 |
| CA | 2654848 A1 | 8/2010 |
| CA | 2503231 C | 6/2011 |
| CA | 2612397 C | 4/2013 |
| CA | 149748 | 11/2014 |
| CA | 152956 | 11/2014 |
| CA | 152957 | 11/2014 |
| CA | 2764310 C | 6/2015 |
| CN | 2118877 U | 10/1992 |
| CN | 1137309 A | 12/1996 |
| CN | 1225298 A | 8/1999 |
| CN | 2426550 Y | 4/2001 |
| CN | 1548701 A | 11/2004 |
| CN | 1908365 A | 2/2007 |
| CN | 2901281 Y | 5/2007 |
| CN | 200999609 Y | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 201162522 Y | 12/2008 |
| CN | 101367099 A | 2/2009 |
| CN | 201206648 Y | 3/2009 |
| CN | 201262043 Y | 6/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202031536 A | 11/2011 |
| CN | 202047762 U | 11/2011 |
| CN | 102323158 A | 1/2012 |
| CN | 202144943 | 2/2012 |
| CN | 202208237 U | 5/2012 |
| CN | 202255848 U | 5/2012 |
| CN | 202255937 U | 5/2012 |
| CN | 202718658 | 2/2013 |
| CN | ZL2013300399164 | 9/2013 |
| CN | ZL201330441389 | 4/2014 |

(56) References Cited

FOREIGN PATENT DOCUMENTS

| | | |
|---|---|---|
| CN | ZL2010800253503 | 5/2014 |
| CN | ZL2013304412416 | 5/2014 |
| DE | 1166571 B | 3/1964 |
| DE | 2415732 A1 | 10/1974 |
| DE | 2358756 A1 | 3/1975 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EC | EU002185371-001 | 2/2013 |
| EC | 002307421-0001 | 9/2013 |
| EC | 002307421-0002 | 9/2013 |
| EP | 0044619 A1 | 1/1982 |
| EP | 0559131 B1 | 1/1996 |
| EP | 1219942 B1 | 8/2004 |
| EP | 1488867 A1 | 12/2004 |
| EP | 2438338 | 4/2015 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 1/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |
| GB | 2521300 A | 6/2015 |
| IN | 251691 | 8/2012 |
| JP | 53108873 A | 9/1978 |
| JP | 53125261 A | 11/1978 |
| JP | 57073187 | 5/1982 |
| JP | 57079400 | 5/1982 |
| JP | 61093344 | 5/1986 |
| JP | 5033883 A | 2/1993 |
| JP | 08075022 | 3/1996 |
| JP | 08128536 | 5/1996 |
| JP | 08291543 | 5/1996 |
| JP | 08300052 | 11/1996 |
| JP | 10175026 | 6/1998 |
| JP | 2000330646 | 11/2000 |
| JP | 2001355774 | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 5/2012 |
| KR | 100540389 B1 | 12/2005 |
| KR | 100540390 B1 | 12/2005 |
| KR | 100540392 B1 | 12/2005 |
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 40533 | 12/2013 |
| MX | 324905 | 10/2014 |
| NL | 258255 A | 4/1964 |
| RU | 1466084 C | 6/1995 |
| RU | 1417281 C | 7/1995 |
| RU | 2088831 C1 | 8/1997 |
| RU | 2242313 C2 | 12/2004 |
| RU | 2367770 C1 | 9/2009 |
| RU | 2367771 C1 | 9/2009 |
| SG | 175263 | 11/2012 |
| SG | 176534 | 11/2012 |
| SG | D2013/186 G | 2/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | 9713398 A2 | 4/1997 |
| WO | 9956047 A2 | 11/1999 |
| WO | 2009023042 A1 | 2/2009 |
| WO | 2010080636 A2 | 7/2010 |
| WO | 2010123889 A2 | 10/2010 |
| WO | 2010141651 A2 | 12/2010 |
| WO | 2010151680 A2 | 12/2010 |
| WO | 2011095453 A1 | 8/2011 |
| WO | 2013023154 A1 | 2/2013 |
| WO | 2014028498 A2 | 2/2014 |
| WO | 2014028795 A2 | 2/2014 |
| WO | 2014042643 A1 | 3/2014 |
| WO | 2015002863 A1 | 1/2015 |

OTHER PUBLICATIONS

"Advisory Action dated May 20, 2013, by the USPTO, re U.S. Appl. No. 12/165,680, 3 pages".
"An Introduction to Rupture Disk Technology," Catalog 77-1001, BS&B Safety Systems, 1994, 3 pages.
"Australian Examination Report, dated Sep. 25, 2014, by IP Australia, re App No. 2010239366, 3 pages".
"Brazil Office Action, dated Jun. 3, 2014, by Brazilian Patent Office, re App No. BR3020130006611, 2 pages".
"Canadian Examination Report dated Apr. 28, 2014, by CIPO, re App No. 2764310, 3 pages."
"Canadian Examination Report dated Feb. 10, 2014, by CIPO, re App No. 152956, 3 pages."
"Canadian Examination Report dated Feb. 7, 2014, by CIPO, re App No. 149748, 1 page."
"Canadian Examination Report dated Jul. 29, 2014, by CIPO, re App No. 2636751, 3 pages."
"Canadian Examiner's Report dated Feb. 10, 2014, by CIPO, re App No. 152957, 3 pages."
"Canadian Notice of Allowance dated Dec. 17, 2014, by CIPO, re App No. 2764310, 1 page."
"Canadian Notice of Allowance dated Dec. 20, 2012, by CIPO, re App No. 2612397, 1 page."
"Canadian Notice of Allowance dated Jun. 22, 2015, by CIPO, re App No. 2636751, 1 page."
"Chinese Office Action dated Jun. 5, 2013, by SIPO, re App No. 2010800253503, 8 pages."
"Chinese Office Action dated Nov. 11, 2016, by SIPO, re App No. 201380054054, 13 pages."
Co-pending U.S. Appl. No. 29/453,837, filed May 3, 2013.
"Second Written Opinion of the International Preliminary Examining Authority, dated Jul. 28, 2014, by the IPEA/US, re PCT/US2013/054741, 7 pages."
Emergency Relief Valve Brochure, SPM, 1997, 4 pages.
"Eurasian Office Action dated Nov. 19, 2013, by the Eurasian Patent Office, re App No. 201171356/31, 8 pages."
"European Examination Report dated Apr. 8, 2014, by the EPO, re App No. 10784052.2, 5 pages."
"European Search Report dated Jul. 4, 2013, by the EPO, re App No. 10784052.2, 7 pages."
"European Search Report dated Mar. 5, 2013, by the EPO, re App No. 10767632.2, 6 pages."
"Examination Report dated Apr. 26, 2013, by IP India, re App No. 251691, 2 pages."
"International Preliminary Report on Patentability dated Jul. 15, 2013, by the IPEA/US, re App No. PCT/US2012/050376, 28 pages."
"International Preliminary Report on Patentability dated Nov. 17, 2014, by the IPEA/US, re App No. PCT/US2013/054741, 31 pages."

(56) References Cited

OTHER PUBLICATIONS

"International Search Report and Written Opinion dated Dec. 16, 2014, by the ISA/US, re App No. PCT/US2014/044813, 12 pages."
"International Search Report and Written Opinion dated Feb. 7, 2017, by the ISA/US, re App No. PCT/US2013/054741, 10 pages."
"International Search Report and Written Opinion dated Jan. 23, 2015, by the ISA/EP, re App No. PCT/US2013/055257, 15 pages."
International Search Report and Written Opinion for Application No. PCT/US2009/068822 dated Aug. 9, 2010, 7 pages.
International Search Report and Written Opinion for Application No. PCT/US2010/031738 dated Dec. 27, 2010, 7 pages.
International Search Report and Written Opinion for Application No. PCT/US2010/037156 dated Jan. 13, 2011, 8 pages.
International Search Report and Written Opinion for Application No. PCT/US2010/039834 dated Feb. 8, 2011, 6 pages.
International Search Report and Written Opinion for Application No. PCT/US2012/050376 dated Oct. 26, 2012, 10 pages.
"International Search Report for Application No. PCT/US2016/37391, by ISA/US, dated Sep. 9, 2016, 2 pages."
"Notice of Allowance dated Apr. 10, 2015, by the USPTO, re U.S. Appl. No. 29/493,861, 8 pages."
"Notice of Allowance dated Apr. 9, 2015, by the USPTO, U.S. Appl. No. 13/965,848, 8 pages."
"Notice of Allowance dated Aug. 29, 2005, by the USPTO, re U.S. Appl. No. 10/690,888, 7 pages."
"Notice of Allowance dated Dec. 17, 2015, by the USPTO, re U.S. Appl. No. 13/886,771, 13 pages."
"Notice of Allowance dated Dec. 26, 2014, by the USPTO, re U.S. Appl. No. 13/918,479, 10 pages."
"Notice of Allowance dated Feb. 11, 2009, by the USPTO, re U.S. Appl. No. 11/414,984, 8 pages."
"Notice of Allowance dated Feb. 12, 2007, by the USPTO, re U.S. Appl. No. 11/013,486, 4 pages."
"Notice of Allowance dated Feb. 19, 2013, by the USPTO, re U.S. Appl. No. 12/793,194, 10 pages."
"Notice of Allowance dated Feb. 7, 2014, by the USPTO, re U.S. Appl. No. 29/449,852, 31 pages."
"Notice of Allowance dated Feb. 7, 2014, by the USPTO, re U.S. Appl. No. 29/449,867, 31 pages."
"Notice of Allowance dated Jan. 16, 2014, by the USPTO, re U.S. Appl. No. 29/453,837, dated 39 pages."
"Notice of Allowance dated Jul. 6, 2005, by the USPTO, re U.S. Appl. No. 10/833,859, 4 pages."
"Notice of Allowance dated Jun. 25, 2014, by the USPTO, re U.S. Appl. No. 12/165,680, 12 pages."
"Notice of Allowance dated Jun. 29, 2010, by the USPTO, re U.S. Appl. No. 11/354,663, 5 pages."
"Notice of Allowance dated May 16, 2012, by the USPTO, re U.S. Appl. No. 12/763,786, 6 pages."
"Notice of Allowance dated Nov. 22, 2013, by the USPTO, re U.S. Appl. No. 12/822,900, 10 pages."
"Notice of Allowance dated Nov. 26, 2013, by the USPTO, re U.S. Appl. No. 29/429,809, 11 pages."
"Notice of Allowance dated Nov. 28, 2014, by the USPTO, re U.S. Appl. No. 13/608,562, 36 pages."
"Notice of Allowance dated Oct. 27, 2015, by the USPTO, re U.S. Appl. No. 13/964,863, 5 pages."
"Notice of Allowance dated Sep. 23, 2008, by the USPTO, re U.S. Appl. No. 11/638,965, 6 pages."
"Office Action dated Apr. 25, 2014, by the USPTO, re U.S. Appl. No. 13/608,562, 31 pages."
"Office Action dated Apr. 30, 2015, by the USPTO, re U.S. Appl. No. 13/886,771, 13 pages."
"Office Action dated Apr. 4, 2008, by the USPTO, re U.S. Appl. No. 11/638,965, 10 pages."
"Office Action dated Aug. 16, 2013, by the USPTO, re U.S. Appl. No. 12/822,900, 15 pages."
"Office Action dated Aug. 30, 2005, by the USPTO, re U.S. Appl. No. 11/013,486, 12 pages."
"Office Action dated Aug. 9, 2011, by the USPTO, re U.S. Appl. No. 12/165,680, 18 pages."
"Office Action dated Dec. 22, 2004, by the USPTO, re U.S. Appl. No. 10/833,859, 5 pages."
"Office Action dated Dec. 30, 1996, by the USPTO, re U.S. Appl. No. 08/643,239, 11 pages."
"Office Action dated Dec. 6, 2012, by the USPTO, re U.S. Appl. No. 12/822,900, 20 pages."
"Office Action dated Feb. 2, 2013, by the Russian Patent Office, re App No. 2013500548, 2 pages."
"Office Action dated Feb. 28, 2014, by the USPTO, re U.S. Appl. No. 12/165,680, 60 pages."
"Office Action dated Jan. 31, 2012, by the USPTO, re U.S. Appl. No. 12/165,680, 28 pages."
"Office Action dated Jan. 5, 2015, by the USPTO, re U.S. Appl. No. 13/572,293, 12 pages."
"Office Action dated Jan. 8, 2010, by the USPTO, re U.S. Appl. No. 11/354,663, 6 pages."
"Office Action dated Jul. 10, 2015, by the USPTO, re U.S. Appl. No. 13/964,863, 36 pages."
"Office Action dated Jul. 12, 2013, by the USPTO, re U.S. Appl. No. 12/165,680, 24 pages."
"Office Action dated Jul. 31, 2014, by the USPTO, re U.S. Appl. No. 13/965,848, 44 pages."
"Office Action dated Jun. 18, 2014, by the USPTO, re U.S. Appl. No. 13/572,293, 29 pages."
"Office Action dated Mar. 19, 2012, by the USPTO, re U.S. Appl. No. 12/642,541, 15 pages."
"Office Action dated Mar. 27, 2014, by the USPTO, re U.S. Appl. No. 13/918,479, 13 pages."
"Office Action dated May 31, 2011, from the UK IP Office, re App No. GB0812086.7, 2 pages."
"Office Action dated Nov. 17, 1983, by the USPTO, re U.S. Appl. No. 06/419,141, 4 pages."
"Office Action dated Oct. 11, 2011, by the USPTO, re U.S. Appl. No. 12/763,786, 9 pages."
"Office Action dated Oct. 25, 2012, by the USPTO, re U.S. Appl. No. 12/793,194, 8 pages."
"Office Action dated Sep. 13, 2013, by the USPTO, re U.S. Appl. No. 13/608,562, 12 pages."
"Office Action dated Mar. 7, 2013, by the USPTO, re U.S. Appl. No. 12/165,680, 23 pages."
"Office Action dated Nov. 6, 2014, by the USPTO, re U.S. Appl. No. 13/965,848, 12 pages."
"Oksanen, K. et al, "Singer Model DLA-RPS—Air Operated Surge Anticipating Electrically Timed Sewage Relief Valve; Schematic A-8809A," Singer Valve, Dec. 8, 2010, XP055159354, 3 pages".
""Product Data Sheet, 10 Station AFAM Trailer," FMC Technologies (www.fmctechnologies.com), PDS50002076-A, Oct. 28, 2011, 6 pages".
Reset Relief Valves brochure, Harrisburg, Inc., 1982, 2 pages.
SPM Flow Control, Inc., "Flow Control Products and Drilling Equipment for the Worldwide Petroleum Industry," [Online] Jan. 8, 2007, 28 pages.
SPM Flow Control, Inc., "High-Pressure Long Radius Swivel Joints," 2002, 1 page.
SPM Flow Control, Inc., "Long Radius Swivel Joints—Operating and Maintenance Instructions—H2S," 1999, 6 pages.
SPM Flow Control, Inc., "Long Radius Swivel Joints—Operating and Maintenance Instructions," 2004, 4 pages.
SPM Flow Control, Inc., "Long Radius Swivel Joints—Operating and Maintenance Instructions," 2006, 6 pages.
SPM Flow Control, Inc., "Long Radius Swivel Joints," 2007, 5 pages.
SPM Flow Control, Inc., "Swivel Joints," 1999, 1 page.
Supplementary European Search Report for Application No. EP09838004 dated Jan. 30, 2013, 4 pages.
""The Strength of Screw Threads Under Repeated Tension" by Herbert F. Moore and Proctor E. Henwood, University of Illinois Engineering Experiment Station, Bulletin No. 264, Mar. 1934 (Mar. 1934), 20 pages."
"U.S. Appl. No. 60/653,014, filed Feb. 15, 2005, "Flowline Torque Arm Assembly," 16 pages."

(56) References Cited

OTHER PUBLICATIONS

"U.S. Appl. No. 60/947,738, filed Jul. 3, 2007, "Swivel Joint with Uniform Ball Bearing Requirements," 12 pages."
"U.S. Appl. No. 61/170,917, filed Apr. 20, 2009, "Flowline Flapper Valve," 9 pages."
"U.S. Appl. No. 61/220,067, filed Jun. 24, 2009, "Stand for Pressure Relief Valve," 12 pages."
"U.S. Appl. No. 61/522,234, filed Aug. 10, 2011, "Rupture Disk Relief Valve," 23 pages."
Valve illustration, Retsco Inc., 1992, 1 page.
"Weir SPM Safety Iron Manifold Trailer, 2008, 2 pages."
"Windlass Engineers & Services," Hammer Unions (Windglass Engineers), Mar. 11, 2015, 8 pages.

\* cited by examiner

PRESSURE RELIEF VALVE ASSEMBLY AND METHODS

CROSS-REFERENCE TO RELATED APPLICATIONS

This application claims the benefit of the filing date of, and priority to, U.S. Application No. 62/214,691, filed Sep. 4, 2015, the entire disclosure of which is hereby incorporated herein by reference.

This application also claims the benefit of the filing date of, and priority to, U.S. Application No. 62/276,611, filed Jan. 8, 2016, the entire disclosure of which is hereby incorporated herein by reference.

TECHNICAL FIELD

This disclosure relates in general to pressure relief and, in particular, pressure relief valve assemblies.

BACKGROUND OF THE DISCLOSURE

A pressure relief valve assembly may include a rupture disc, which ruptures when the pressure differential across the pressure relief valve assembly reaches or exceeds a predetermined pressure differential. The rupturing of the rupture disc permits fluid to flow through the pressure relief valve assembly, reducing or relieving fluid pressure upstream of the pressure relief valve assembly. However, after the rupture disc has ruptured, in some cases shrapnel from the rupture disc will not flow out of the pressure relief valve assembly, creating an unwanted pressure spike. Further, after the rupture disc of a pressure relief valve assembly ruptures, the entire pressure relief valve assembly must be replaced, increasing costs associated with pressure relief efforts. Still further, in some cases the quantity of parts necessary to assemble the pressure relief valve assembly, as well as the amount of time necessary for assembly, may also increase costs associated with pressure relief efforts. Therefore, what is needed is a pressure relief valve assembly or method that addresses one or more of the foregoing issues, and/or other issue(s).

SUMMARY

In a first aspect, there is provided a pressure relief valve assembly defining a longitudinally-extending center axis, the pressure relief valve assembly including a first sub defining a first internal fluid passage, the first internal fluid passage being generally coaxial with the center axis; a second sub defining a second internal fluid passage, the second internal fluid passage being generally coaxial with the center axis and thus with the first internal fluid passage; a sub connection that connects the first and second subs; and a rupture disc clamped between the connected first and second subs so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein each of the first and second subs includes one of a first element combination and a second element combination; wherein the first element combination includes a first end face opposing the sub connection; a frusto-conical surface extending angularly from the first end face; and an external annular shoulder axially positioned between the frusto-conical surface and the sub connection; and wherein the second element combination includes a first external threaded connection opposing the sub connection; a first internal annular shoulder opposing the sub connection; a first annular groove adjacent the first internal annular shoulder; and an internal seal ring engaged with the first internal annular shoulder and extending within the annular groove.

In an exemplary embodiment, the first sub defines a second end face at the sub connection, and wherein the first sub includes a first counterbore formed in the second end face; and a second internal annular shoulder defined by the first counterbore and with which the rupture disc is engaged; wherein the second sub defines a third end face at the sub connection, and wherein the second sub includes a second counterbore formed in the third end face; and a third internal annular shoulder defined by the second counterbore and with which the rupture disc is engaged; and wherein the pressure relief valve assembly further includes a second annular groove formed in one of the first and second internal annular shoulders; and a sealing element extending within the second annular groove and sealingly engaging the rupture disc.

In another exemplary embodiment, the first sub includes a second external threaded connection formed in the exterior of the first sub and adjacent the second end face; wherein the second sub includes an internal threaded connection formed in the interior of the second sub at the second counterbore thereof, the internal threaded connection extending between the third end face and the third internal annular shoulder; wherein the second external threaded connection is threadably engaged with the internal threaded connection to connect the first and second subs; and wherein the sub connection includes the second external threaded connection and the internal threaded connection.

In yet another exemplary embodiment, the first and second subs include first and second flanges, respectively, which are connected to one another; and wherein the sub connection includes the first and second flanges, and a plurality of fasteners connecting the first and second flanges.

In certain exemplary embodiments, the first and second internal fluid passages define first and second internal diameters, respectively; and wherein the second internal diameter is greater than the first internal diameter to increase the likelihood that shrapnel from the ruptured rupture disc will flow out of at least one of the first and second subs.

In an exemplary embodiment, the second internal diameter is at least 25% greater than the first internal diameter.

In another exemplary embodiment, the second internal diameter is about 25% to about 50% greater than the first internal diameter.

In a second aspect, there is provided a pressure relief valve assembly defining a longitudinally-extending center axis, the pressure relief valve assembly including a first sub defining a first internal fluid passage, the first internal fluid passage being generally coaxial with the center axis; a second sub connected to the first sub and defining a second internal fluid passage, the second internal fluid passage being generally coaxial with the center axis and thus with the first internal fluid passage; a rupture disc clamped between the connected first and second subs so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the first sub defines a first end face, and wherein the first sub includes a first external threaded connection formed in the exterior of the first sub and adjacent the first end face; a first counterbore formed in the first end face; and a first internal annular shoulder defined by the first counterbore and with which the rupture disc is engaged; wherein the second sub defines a second end face, and wherein the second sub includes a second counterbore formed in the second end face; a second internal annular shoulder defined by the second counterbore and with which the rupture disc is engaged; and an internal threaded connection formed in the interior of the second sub at the second counterbore thereof, the internal threaded connection extending between the second end face and the second internal annular shoulder; wherein the pressure relief valve assembly further includes a first annular groove formed in one of the first and second internal annular shoulders; and a sealing element extending within the first annular groove and sealingly engaging the rupture disc; and wherein the first external threaded connection is threadably engaged with the internal threaded connection to connect the first and second subs and to clamp the rupture disc therebetween.

In an exemplary embodiment, the first sub includes a third end face opposing the first end face; a frusto-conical surface extending angularly from the third end face; and an external annular shoulder axially positioned between the frusto-conical surface and the first end face.

In another exemplary embodiment, the second sub includes a second external threaded connection formed in the exterior of the second sub at an end portion thereof that opposes the second end face; a third internal annular shoulder opposing the second end face; a second annular groove adjacent the third internal annular shoulder; and an internal seal ring engaged with the third internal annular shoulder and extending within the second annular groove.

In yet another exemplary embodiment, the first and second internal fluid passages define first and second internal diameters, respectively; and wherein the second internal diameter is greater than the first internal diameter to increase the likelihood that shrapnel from the ruptured rupture disc will flow out of at least one of the first and second subs.

In certain exemplary embodiments, the second internal diameter is at least 25% greater than the first internal diameter.

In an exemplary embodiment, the second internal diameter is about 25% to about 50% greater than the first internal diameter.

In a third aspect, there is provided a pressure relief valve assembly defining a longitudinally-extending center axis, the pressure relief valve assembly including a first sub defining a first internal fluid passage, the first internal fluid passage being generally coaxial with the center axis; a second sub connected to the first sub and defining a second internal fluid passage, the second internal fluid passage being generally coaxial with the center axis and thus with the first internal fluid passage; and a rupture disc clamped between the connected first and second subs so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the first and second internal fluid passages define first and second internal diameters, respectively; and wherein the second internal diameter is greater than the first internal diameter to increase the likelihood that shrapnel from the ruptured rupture disc will flow out of at least one of the first and second subs.

In an exemplary embodiment, the second internal diameter is at least 25% greater than the first internal diameter.

In another exemplary embodiment, the second internal diameter is about 25% to about 50% greater than the first internal diameter.

In yet another exemplary embodiment, each of the first and second subs defines a first end face and includes one of a first element combination and a second element combination; wherein the first element combination includes a second end face opposing the first end face; a frusto-conical surface extending angularly from the second end face; and an external annular shoulder axially positioned between the frusto-conical surface and the first end face; and wherein the second element combination includes a first external threaded connection at an end portion that opposes the first end face; a first internal annular shoulder opposing the first end face; a first annular groove adjacent the first internal annular shoulder; and an internal seal ring engaged with the first internal annular shoulder and extending within the annular groove.

In certain exemplary embodiments, the first sub defines a first end face, and wherein the first sub includes a first counterbore formed in the first end face; and a first internal annular shoulder defined by the first counterbore and with which the rupture disc is engaged; wherein the second sub defines a second end face, and wherein the second sub includes a second counterbore formed in the second end face; and a second internal annular shoulder defined by the second counterbore and with which the rupture disc is engaged; and wherein the pressure relief valve assembly further includes a first annular groove formed in one of the first and second internal annular shoulders; and a sealing element extending within the first annular groove and sealingly engaging the rupture disc.

In an exemplary embodiment, the first sub includes a first external threaded connection formed in the exterior of the first sub and adjacent the first end face; wherein the second sub includes an internal threaded connection formed in the interior of the second sub at the second counterbore thereof, the internal threaded connection extending between the second end face and the second internal annular shoulder; wherein the first external threaded connection is threadably engaged with the internal threaded connection to connect the first and second subs and clamp the rupture disc therebetween.

In a fourth aspect, there is provided a method of retrofitting a pressure relief valve assembly, the pressure relief valve assembly including a first sub and a second sub connected thereto, the pressure relief valve assembly further including a first rupture disc clamped between the first and second subs, the method including disconnecting the first and second subs to access the first rupture disc; removing a first rupture disc from between the first and second subs; inserting a second rupture disc between the first and second subs; and reconnecting the first and second subs to clamp the second rupture disc therebetween.

In an exemplary embodiment, disconnecting the first and second subs to access the first rupture disc includes threadably disengaging an internal threaded connection of the second sub from an external threaded connection of the first sub.

In another exemplary embodiment, disconnecting the first and second subs to access the first rupture disc includes removing fasteners from first and second flanges, the first and second flanges being part of the first and second subs, respectively.

In yet another exemplary embodiment, the first rupture disc is removed after the first rupture disc is deemed unsuitable.

In a fifth aspect, there is provided a method of assembling a plug relief valve assembly, the method including providing a wing nut, the wing nut including: opposing first and second end portions; a first internal threaded connection formed in the interior of the wing nut and adjacent, or at least proximate, the first end portion; and an internal annular shoulder defined in the interior of the wing nut at an axial position between the first internal threaded connection and the second end portion; providing a male sub, the male sub including: opposing first and second end faces; a frusto-conical surface extending angularly from the first end face; an external threaded connection formed in the exterior of the male sub and adjacent the second end face; and an external annular shoulder formed in the exterior of the male sub at an axial location between the frusto-conical surface and the external threaded connection; passing at least a portion of the male sub through the wing nut, the portion of the male sub including the external threaded connection of the male sub; after passing the portion of the male sub through the wing nut, connecting a female sub to the male sub, wherein connecting the female sub to the male sub includes threadably engaging the external threaded connection of the male sub with a second internal threaded connection of the female sub.

In an exemplary embodiment, after the female sub is connected to the male sub, the wing nut is axially trapped between the external annular shoulder of the male sub and the female sub.

In another exemplary embodiment, axial movement of the wing nut is limited by the engagement of the second end portion of the wing nut with the female sub.

In yet another exemplary embodiment, axial movement of the wing nut is limited by the engagement of the internal annular shoulder of the wing nut with the external annular shoulder of the male sub; wherein the second axial direction is opposite the first axial direction.

In certain exemplary embodiments, axial movement of the wing nut in a first axial direction is limited by the engagement of the second end portion of the wing nut with the female sub; wherein axial movement of the wing nut in a second axial direction is limited by the engagement of the internal annular shoulder of the wing nut with the external annular shoulder of the male sub; and wherein the second axial direction is opposite the first axial direction.

In a sixth aspect, there is provided a pressure relief valve assembly defining a longitudinally-extending center axis, the pressure relief valve assembly including a body defining a first internal fluid passage, the first internal fluid passage being generally coaxial with the center axis, the body including a counterbore formed therein, a first internal annular shoulder defined by the counterbore, and an internal threaded connection formed in the interior of the body at the counterbore thereof; a retainer nut connected to the body and defining a second internal fluid passage, the second internal fluid passage being generally coaxial with the center axis and thus with the first internal fluid passage, the retainer nut including an external threaded connection formed in the exterior thereof; and a rupture disc clamped between the retainer nut and the first annular shoulder of the body so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the first external threaded connection of the retainer nut is threadably engaged with the internal threaded connection of the body to connect the retainer nut to the body and clamp the rupture disc between the retainer nut and the first annular shoulder of the body.

In an exemplary embodiment, the pressure relief valve assembly further includes a first annular groove formed in the first internal annular shoulder, and a sealing element extending within the first annular groove and sealingly engaging the rupture disc.

In another exemplary embodiment, the body further includes an end face, a frusto-conical surface extending angularly from the end face, and an external annular shoulder axially positioned between the frusto-conical surface and the end face.

In yet another exemplary embodiment, the body further includes a second external threaded connection formed in the exterior of the body at an end portion thereof that opposes the end face; a second internal annular shoulder opposing the end face; an annular groove adjacent the second internal annular shoulder; and an internal seal ring engaged with the second internal annular shoulder and extending within the annular groove.

In certain exemplary embodiments, the pressure relief valve assembly further includes a frusto-conical surface formed in the interior of the body and axially between the first internal fluid passage and one of: the end face and the second internal annular shoulder.

In an exemplary embodiment, the rupture disc defines a third internal fluid passage through which the first and second fluid passages are in fluid communication when the rupture disc ruptures; wherein the first, second, and third internal fluid passages define first, second, and third internal diameters, respectively; and wherein the third diameter is smaller than at least one of the first and second diameters to increase the likelihood that shrapnel from the ruptured rupture disc will flow out of the body.

In another exemplary embodiment, at least one of the first and second internal diameters is at least 25% greater than the third internal diameter.

In yet another exemplary embodiment, at least one of the first and second internal diameters is about 25% to about 50% greater than the third internal diameter.

In certain exemplary embodiments, the pressure relief valve assembly further includes a washer extending within the counterbore and adjacent the rupture disc so that both the washer and the rupture disc are clamped between the retainer nut and the body; and the washer prevents, or at least obstructs, the external threaded connection of the retainer nut from threadably disengaging from the internal threaded connection of the body.

In a seventh aspect, there is provided a pressure relief valve assembly defining a longitudinally-extending center axis, the pressure relief valve assembly including a body defining a first internal fluid passage having a first internal diameter, the first internal fluid passage being generally coaxial with the center axis, the body including a counterbore formed therein and a first internal annular shoulder defined by the counterbore; a retainer nut connected to the body and defining a second internal fluid passage having a second internal diameter, the second internal fluid passage being generally coaxial with the center axis and thus with the first internal fluid passage; a rupture disc clamped between the retainer nut and the first annular shoulder of the body so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the rupture disc defines a third internal fluid passage through which the first and second fluid passages are in fluid communication when the rupture disc ruptures; wherein the first, second, and third internal fluid passages define first, second, and third internal diameters, respectively; and wherein the third diameter is less than at least one of the first and second diameters to increase the likelihood that shrapnel from the ruptured rupture disc will flow out of the body.

In an exemplary embodiment, at least one of the first and second internal diameters is at least 25% greater than the third internal diameter.

In another exemplary embodiment, at least one of the first and second internal diameters is about 25% to about 50% greater than the third internal diameter.

In yet another exemplary embodiment, the pressure relief valve assembly further includes a first annular groove formed in the first internal annular shoulder, and a sealing element extending within the first annular groove and sealingly engaging the rupture disc.

In certain exemplary embodiments, the body further includes an end face, a frusto-conical surface extending angularly from the end face, and an external annular shoulder axially positioned between the frusto-conical surface and the end face.

In an exemplary embodiment, the body further includes an external threaded connection formed in the exterior of the body at an end portion thereof that opposes the end face; a second internal annular shoulder opposing the end face; an annular groove adjacent the second internal annular shoulder; and an internal seal ring engaged with the second internal annular shoulder and extending within the annular groove.

In another exemplary embodiment, the pressure relief valve assembly further includes a frusto-conical surface formed in the interior of the body and axially between the first internal fluid passage and one of: the end face and the second internal annular shoulder.

In yet another exemplary embodiment, the pressure relief valve assembly further includes a washer extending within the counterbore and adjacent the rupture disc so that both the washer and the rupture disc are clamped between the retainer nut and the body; and the washer prevents, or at least obstructs, the external threaded connection of the retainer nut from threadably disengaging the internal threaded connection of the body.

In certain exemplary embodiment, an internal threaded connection is formed in the interior of the body at the counterbore thereof; an external threaded connection is formed in the exterior of the retainer nut; and the first external threaded connection of the retainer nut is threadably engaged with the internal threaded connection of the body to connect the retainer nut to the body and clamp the rupture disc between the retainer nut and the first annular shoulder of the body.

In an eighth aspect, there is provided a pressure relief valve assembly defining a longitudinally-extending center axis, the pressure relief valve assembly including opposing first and second end portions, wherein each of the first and second end portions includes one of a first element combination and a second element combination; wherein the first element combination includes a first end face; a frusto-conical surface extending angularly from the first end face; and an external annular shoulder axially positioned between the frusto-conical surface and one of the first and second end portions; and wherein the second element combination includes a second end face; a first external threaded connection proximate the second end face; a first internal annular shoulder axially positioned between the second end face and at least a portion of the first external threaded connection; a first annular groove adjacent the first internal annular shoulder; and an internal seal ring engaged with the first internal annular shoulder and extending within the annular groove; a first counterbore positioned axially between the first and second end portions, the first counterbore defining a second internal annular shoulder; an axially-facing surface positioned axially between the second internal annular shoulder and one of the first and second end portions; and a rupture disc clamped between the second internal annular shoulder and the axially-facing surface, the rupture disc being adapted to rupture when a pressure differential across the pressure relief valve assembly reaches or exceeds a predetermined pressure differential.

In an exemplary embodiment, the pressure relief valve assembly further includes a first sub, the first sub including the first end portion; and a second sub connected to the first sub, the second sub including the second end portion; wherein the first counterbore is formed in the first sub so that the first sub includes the first internal annular shoulder; wherein a second counterbore is formed in the second sub, the second counterbore defining the axially-facing surface; and wherein the connection between the first and second subs clamps the rupture disc between the second internal annular shoulder and the axially-facing surface.

In another exemplary embodiment, the pressure relief valve assembly further includes a body, wherein the body includes the first and second end portions, and wherein the first counterbore is formed in the body so that the body includes the first internal annular shoulder; and a retainer nut connected to the body, the retainer nut defining the axially-facing surface; wherein the connection between the retainer nut and the body clamps the rupture disc between the second internal annular shoulder and the axially-facing surface.

In a ninth aspect, there is provided a pressure relief valve assembly defining a longitudinally-extending center axis, the pressure relief valve assembly comprising a first sub defining a first internal fluid passage, the first internal fluid passage being generally coaxial with the center axis, the first sub comprising a counterbore formed therein, a first internal annular shoulder defined by the counterbore, and an internal threaded connection formed in the interior of the first sub at the counterbore thereof; a second sub connected to the first sub and defining a second internal fluid passage, the second internal fluid passage being generally coaxial with the center axis and thus with the first internal fluid passage, the second sub comprising an external threaded connection formed in the exterior thereof; and a rupture disc clamped between the second sub and the first annular shoulder of the first sub so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the first external threaded connection of the second sub is threadably engaged with the internal threaded connection of the first sub to connect the second sub to the first sub and clamp the rupture disc therebetween.

In an exemplary embodiment, the pressure relief valve assembly further comprises a first annular groove formed in the first internal annular shoulder, and a sealing element extending within the first annular groove and sealingly engaging the rupture disc.

In another exemplary embodiment, the first sub further comprises an end face, a frusto-conical surface extending angularly from the end face, and an external annular shoulder axially positioned between the frusto-conical surface and the end face.

In yet another exemplary embodiment, the first sub further comprises a second external threaded connection formed in the exterior of the first sub at an end portion thereof that opposes the end face; a second internal annular shoulder opposing the end face; an annular groove adjacent the second internal annular shoulder; and an internal seal ring engaged with the second internal annular shoulder and extending within the annular groove.

In certain exemplary embodiments, the pressure relief valve assembly further comprises a frusto-conical surface formed in the interior of the first sub and axially between the first internal fluid passage and one of: the end face and the second internal annular shoulder.

In an exemplary embodiment, the rupture disc defines a third internal fluid passage through which the first and second fluid passages are in fluid communication when the rupture disc ruptures; wherein the first, second, and third internal fluid passages define first, second, and third internal diameters, respectively; and wherein the third diameter is smaller than at least one of the first and second diameters to increase the likelihood that shrapnel from the ruptured rupture disc will flow out of the first sub.

In another exemplary embodiment, at least one of the first and second internal diameters is at least 25% greater than the third internal diameter.

In yet another exemplary embodiment, at least one of the first and second internal diameters is about 25% to about 50% greater than the third internal diameter.

In certain exemplary embodiment, the pressure relief valve assembly further comprises a washer extending within the counterbore and adjacent the rupture disc so that both the washer and the rupture disc are clamped between the second sub and the first sub; and the washer prevents, or at least obstructs, the external threaded connection of the second sub from threadably disengaging from the internal threaded connection of the first sub.

In a tenth aspect, there is provided a pressure relief valve assembly defining a longitudinally-extending center axis, the pressure relief valve assembly comprising a first sub defining a first internal fluid passage that is generally coaxial with the center axis, the first sub comprising a counterbore formed therein and a first internal annular shoulder defined by the counterbore; a second sub connected to the first sub and defining a second internal fluid passage that is generally coaxial with the center axis and thus with the first internal fluid passage; a rupture disc clamped between the second sub and the first annular shoulder of the first sub so that the rupture disc is positioned axially between the first and second internal fluid passages, the rupture disc being adapted to rupture when a pressure differential across the pressure relief valve assembly reaches or exceeds a predetermined pressure differential, so that the first and second internal fluid passages are in fluid communication; wherein the rupture disc defines a third internal fluid passage through which the first and second fluid passages are in fluid communication when the rupture disc ruptures; wherein the first, second, and third internal fluid passages define first, second, and third internal diameters, respectively; and wherein the third diameter is less than at least one of the first and second diameters to increase the likelihood that shrapnel from the ruptured rupture disc will flow out of the first sub.

In an exemplary embodiment, at least one of the first and second internal diameters is at least 25% greater than the third internal diameter.

In another exemplary embodiment, at least one of the first and second internal diameters is about 25% to about 50% greater than the third internal diameter.

In yet another exemplary embodiment, the pressure relief valve assembly further comprises a first annular groove formed in the first internal annular shoulder, and a sealing element extending within the first annular groove and sealingly engaging the rupture disc.

In certain exemplary embodiments, the first sub further comprises an end face, a frusto-conical surface extending angularly from the end face, and an external annular shoulder axially positioned between the frusto-conical surface and the end face.

In an exemplary embodiment, the first sub further comprises an external threaded connection formed in the exterior of the first sub at an end portion thereof that opposes the end face; a second internal annular shoulder opposing the end face; an annular groove adjacent the second internal annular shoulder; and an internal seal ring engaged with the second internal annular shoulder and extending within the annular groove.

In another exemplary embodiment, the pressure relief valve assembly further comprises a frusto-conical surface formed in the interior of the first sub and axially between the first internal fluid passage and one of: the end face and the second internal annular shoulder.

In yet another exemplary embodiment, the pressure relief valve assembly further comprises a washer extending within the counterbore and adjacent the rupture disc so that both the washer and the rupture disc are clamped between the second sub and the first sub; and the washer prevents, or at least obstructs, the external threaded connection of the second sub from threadably disengaging the internal threaded connection of the first sub.

In certain exemplary embodiments, an internal threaded connection is formed in the interior of the first sub at the counterbore thereof; an external threaded connection is formed in the exterior of the second sub; and the first external threaded connection of the second sub is threadably engaged with the internal threaded connection of the first sub to connect the second sub to the first sub and clamp the rupture disc between the second sub and the first annular shoulder of the first sub.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1:
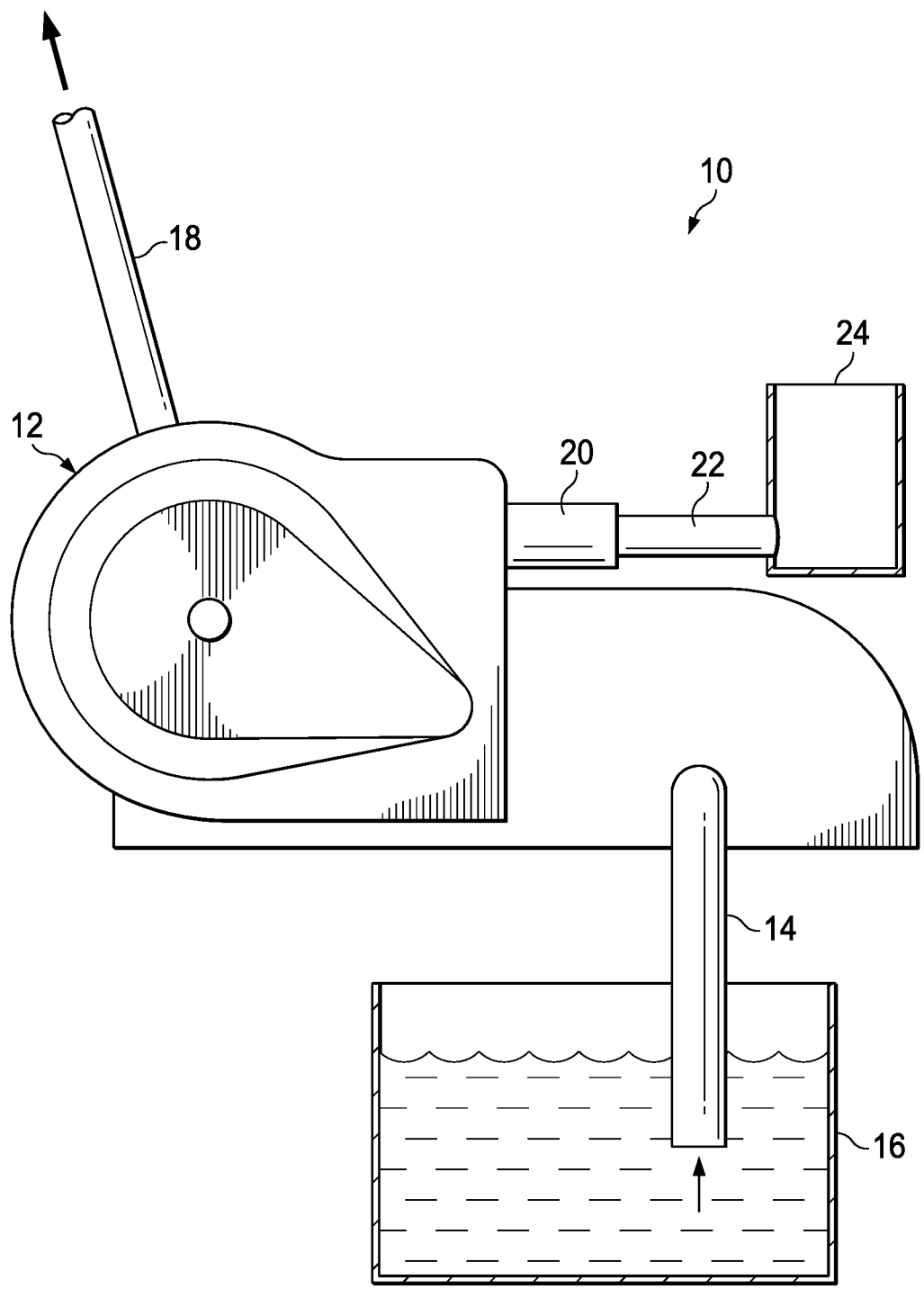
FIG. 1 is a diagrammatic illustration of a pumping system according to an exemplary embodiment, the pumping system including a pressure relief valve assembly.

In an exemplary embodiment, as illustrated in FIG. 1, a pumping system is generally referred to by the reference numeral 10 and includes a pump assembly 12, which is in fluid communication with an intake pipe 14. A fluid reservoir, such as a holding tank 16, is in fluid communication with the intake pipe 14. A discharge pipe 18 is fluid communication with the pump assembly 12. A pressure relief valve assembly 20 is in fluid communication with the pump assembly 12. The pressure relief valve assembly 20 is connected to, and in fluid communication with, a vent pipe 22, which in turn is connected to, and in fluid communication with, a fluid reservoir, such as an open tank 24.

In operation, in several exemplary embodiments, the pump assembly 12 draws fluid from the holding tank 16 through the intake pipe 14, and discharges the fluid at a substantially higher pressure through the discharge pipe 18. As will be described in further detail below, during the operation of the pump assembly 12, the pressure relief valve assembly 20 prevents an overpressure condition within at least the pump assembly 12 and/or the discharge pipe 18. More particularly, when the pressure differential across the pressure relief valve assembly 20 reaches or exceeds a predetermined pressure differential, the pressure relief valve assembly 20 operates to reduce, or relieve, the pressure within the pump assembly 12 by permitting fluid to flow from the pump assembly 12, through the pressure relief valve assembly 20 and the vent pipe 22, and into the open tank 24. As a result, the pressure relief valve assembly 20 operates to prevent a further increase in pressure so as to prevent or otherwise substantially reduce the likelihood of damage to the pumping system 10 and/or any system(s) in fluid communication therewith.

In several exemplary embodiments, the pump assembly 12 is a high pressure mud pump used in energy exploration and/or production operations, the fluid pumped through the pump assembly 12 is drilling fluid or drilling mud, the discharge pipe 18 is operable to deliver the drilling mud to a wellhead assembly for injection into a well that penetrates one or more subterranean formations, and the predetermined pressure differential at which the pressure relief valve assembly 20 operates to relieve pressure is, for example, 6,000 psi, 10,400 psi, 12,400 psi, 14,450 psi, 15,500 psi, or a pressure greater than 15,500 psi. In several exemplary embodiments, instead of being a high pressure mud pump used in energy exploration and/or production operations, the pump assembly 12 is used in one or more other types of pumping systems used in energy exploration and/or production operations, one or more other types of pumping systems used in operations other than energy exploration and/or production operations, one or more types of fluid systems, one or more types of industrial systems, etc. In several exemplary embodiments, the combination of at least the pump assembly 12 and the pressure relief valve assembly 20 is, includes, or is part of, one or more pumping units. In several exemplary embodiments, the combination of at least the pump assembly 12 and the pressure relief valve assembly 20 is, includes, or is part of, a primary pumping line. In several exemplary embodiments, the combination of at least the pump assembly 12 and the pressure relief valve assembly 20 is, includes, or is part of, a main line. In several exemplary embodiments, the combination of at least the pump assembly 12 and the pressure relief valve assembly 20 is, includes, or is part of, a main line and the pressure relief valve assembly 20 provides secondary pressure relief.

As shown in FIG. 1, the pressure relief valve assembly 20 is in fluid communication with the pump assembly 12 by being connected directly to the pump assembly 12; however, in several exemplary embodiments, the pressure relief valve assembly 20 is in fluid communication with the pump assembly 12 by being connected directly to the discharge pipe 18. In several exemplary embodiments, one or both of the vent pipe 22 and the open tank 24 is/are omitted from the pumping system 10.

Figure 2:
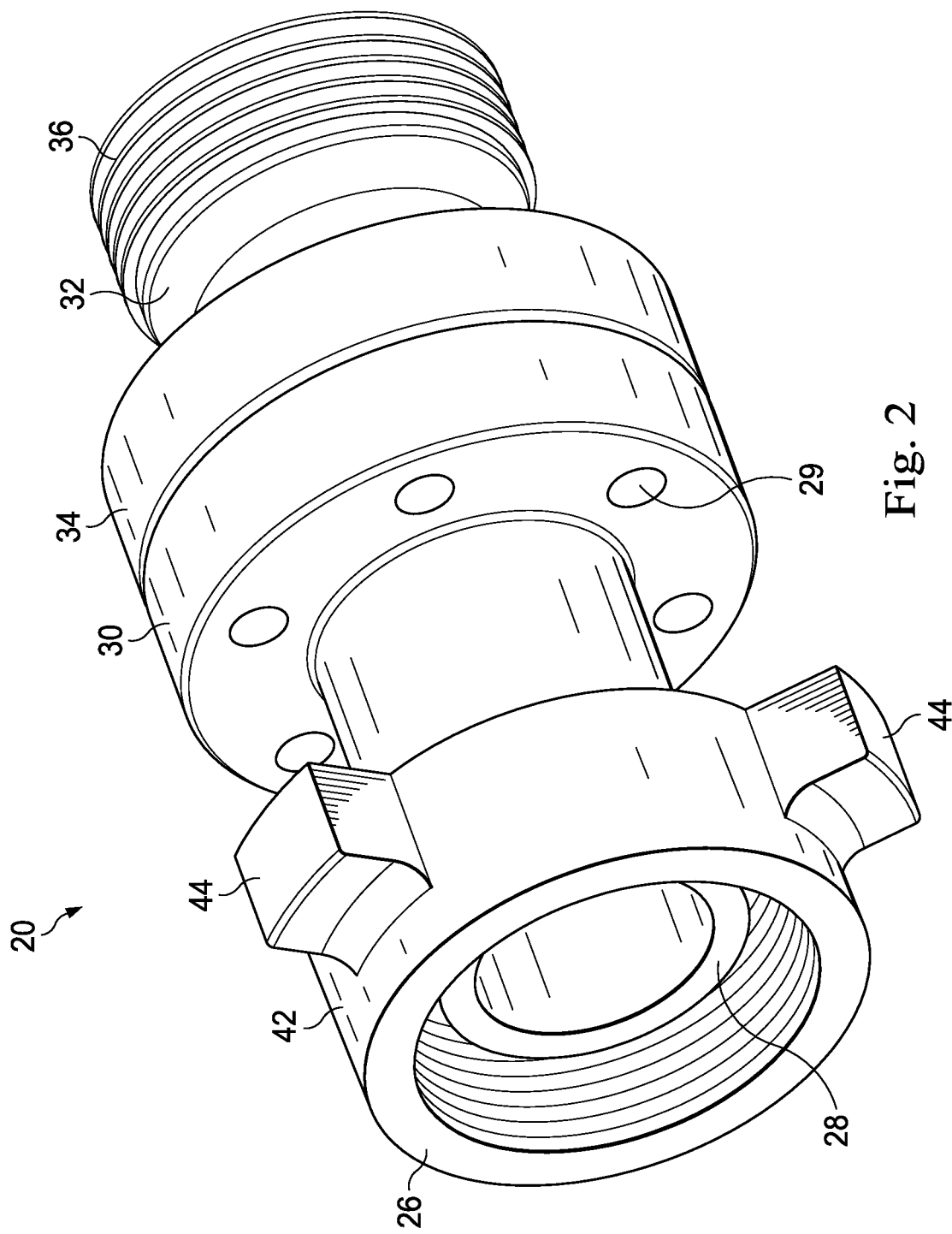
FIG. 2 is a perspective view of the pressure relief valve assembly of FIG. 1, according to an exemplary embodiment.
Figure 3:
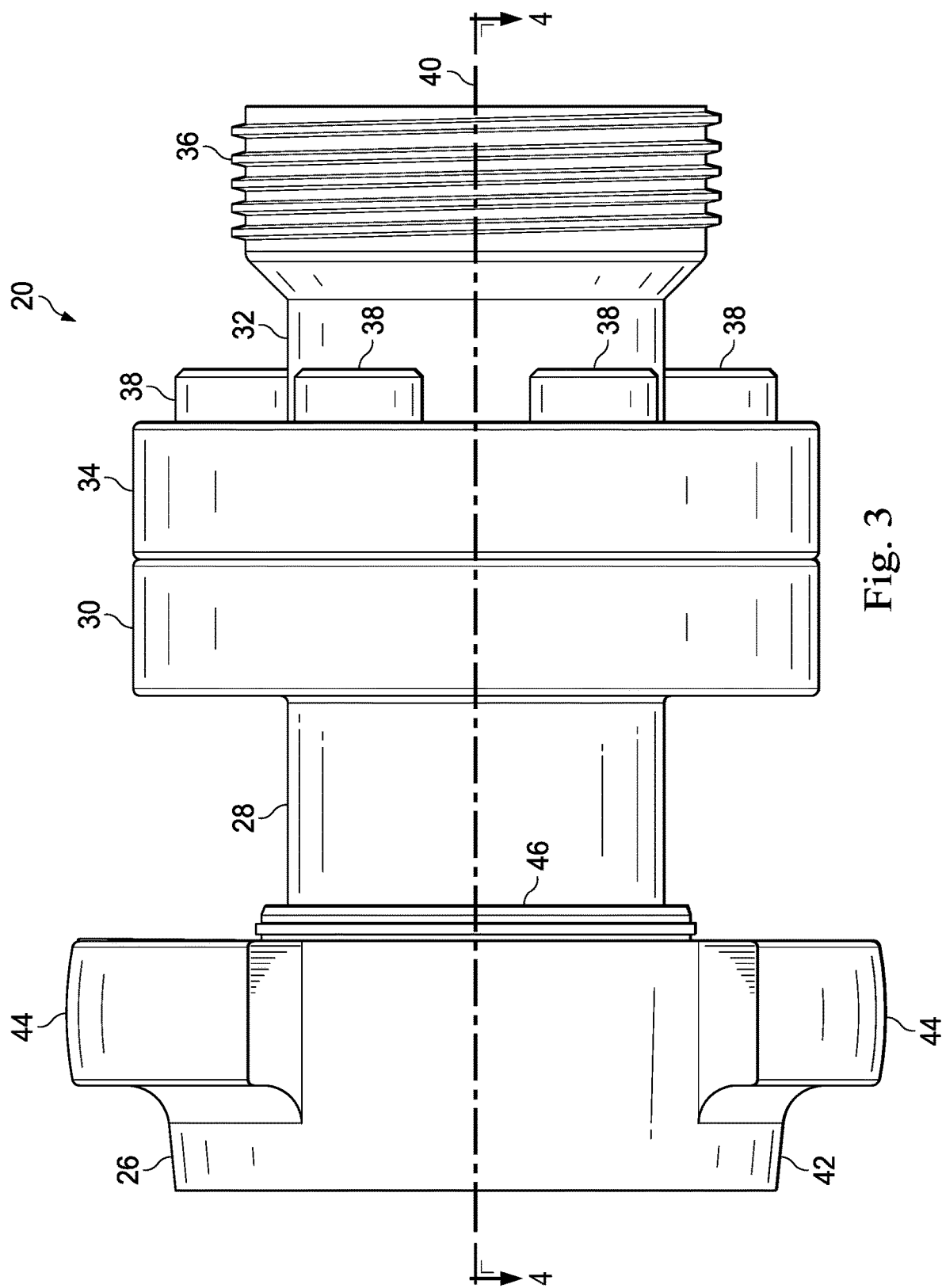
FIG. 3 is a side view of the pressure relief valve assembly of FIG. 2, according to an exemplary embodiment.

In an exemplary embodiment, as illustrated in FIGS. 2 and 3 with continuing reference to FIG. 1, the pressure relief valve assembly 20 includes a wing nut 26, a male sub 28 including a flange 30 at one end portion thereof, a female sub 32 including a flange 34 and an external threaded connection 36 at opposing end portions thereof, and a plurality of fasteners 38. In several exemplary embodiment, the male sub 28 may be referred to as a "first sub," and the female sub 32 may be referred to as a "second sub." Alternatively, in several exemplary embodiments, the female sub 32 may be referred to as a "first sub," and the male sub 28 may be referred to as a "second sub." A longitudinally-extending center axis 40 is defined by the pressure relief valve assembly 20. The wing nut 26 includes an annular body 42 and a plurality of circumferentially-spaced lugs 44 extending radially outward from the annular body 42.

Figure 4:
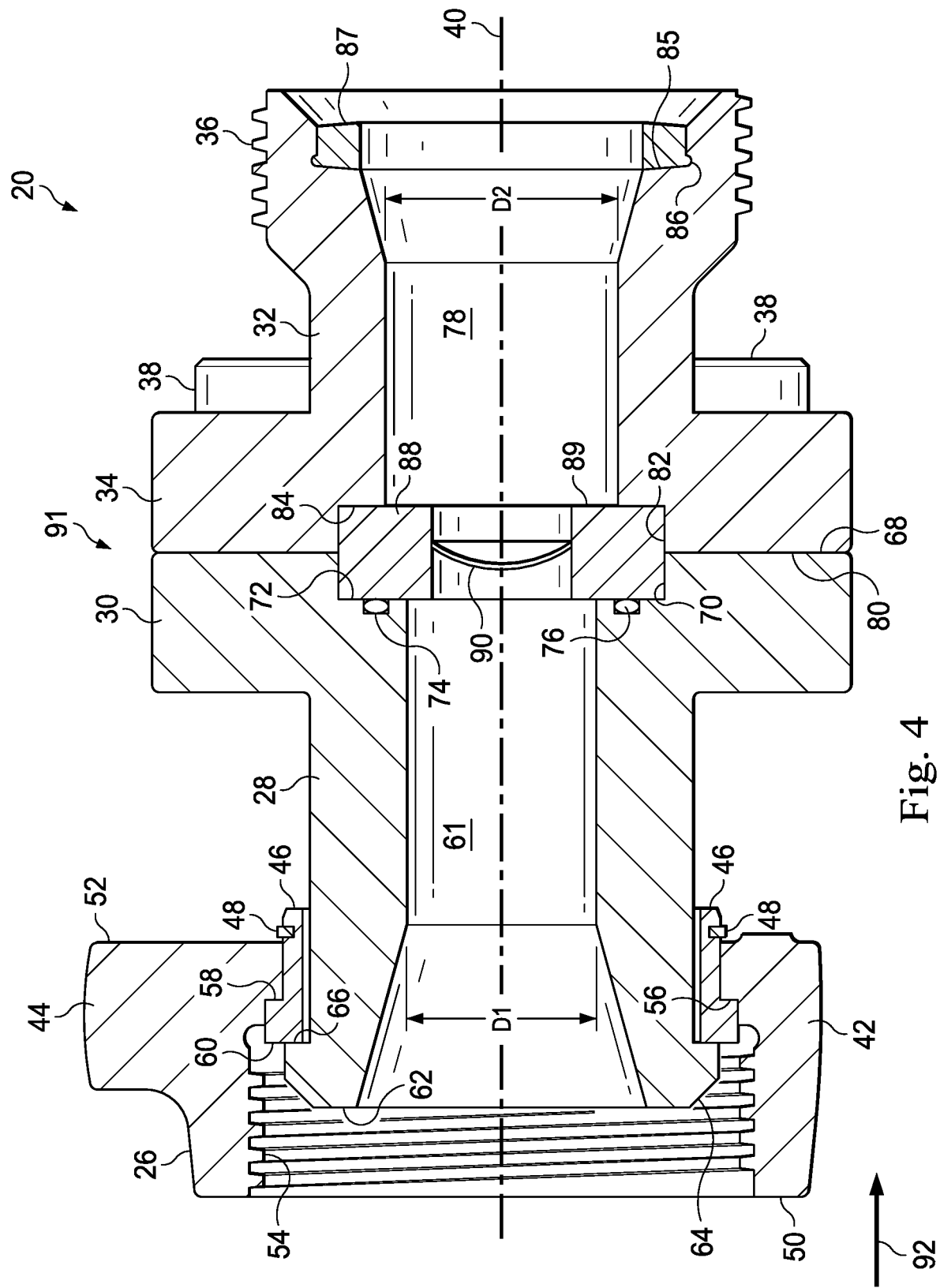
FIG. 4 is a section view of the pressure relief valve assembly of FIGS. 2 and 3 taken along line 4-4 of FIG. 3, according to an exemplary embodiment.

In an exemplary embodiment, as illustrated in FIGS. 3 and 4 with continuing reference to FIGS. 1 and 2, the pressure relief valve assembly 20 further includes one or more circumferentially-extending retainer segments 46 concentrically disposed about the male sub 28. The one or more retainer segments 46 are held together with a retainer ring 48, which extends circumferentially about the male sub 28.

In an exemplary embodiment, as illustrated most clearly in FIG. 4, with continuing reference to FIGS. 1, 2, and 3, the annular body 42 of the wing nut 26 includes opposing end portions 50 and 52, and an internal threaded connection 54 formed in the interior of the annular body 42 and adjacent, or at least proximate, the end portion 50. An internal annular shoulder 56 is defined in the interior of the annular body 42 at an axial position between the internal threaded connection 54 and the end portion 52. Each of the one or more retainer segments 46 extend within the wing nut 26 and include respective external shoulders 58, which are axially spaced from the retainer ring 48 and engage the internal annular shoulder 56 of the wing nut 26. Respective end faces 60 are defined by the one or more retainer segments 46, and face axially in a direction away from the retainer ring 48.

An internal fluid passage 61 having a diameter D1 is defined by the male sub 28. In an exemplary embodiment, the diameter D1 is 2 inches. The internal fluid passage 61 is substantially coaxial with the axis 40. An axially-facing end face 62 is also defined by the male sub 28 at the end thereof opposing the flange 30. A frusto-conical surface 64 of the male sub 28 extends angularly away from the end face 62. An external annular shoulder 66 is formed in the exterior of the male sub 28 at the end portion thereof opposing the flange 30; as a result, the external annular shoulder 66 is axially positioned between the frusto-conical surface 64 and the flange 30. An axially-facing end face 68 is defined by the flange 30. A counterbore 70 is formed in the end face 68, thereby defining an internal annular shoulder 72 of the male sub 28. An annular groove 74 is formed in the internal annular shoulder 72. A sealing element 76, such as an O-ring, extends within the annular groove 74.

An internal fluid passage 78 having a diameter D2 is defined by the female sub 32. In an exemplary embodiment, as shown in FIG. 4, the diameter D2 is greater than the diameter D1. In an exemplary embodiment, the diameter D2 is 2.5 inches. In an exemplary embodiment, the diameter D1 is 2 inches, and the diameter D2 is 2.5 inches. In an exemplary embodiment, the diameter D2 is at least 25% greater than the diameter D1 (D2 is at least 1.25× of D1). In an exemplary embodiment, the diameter D2 is about 25% to about 50% greater than the diameter D1 (D2 is about 1.25× to about 1.50× of D1). The internal fluid passage 78 is substantially coaxial with the axis 40 and thus with the internal fluid passage 61. An axially-facing end face 80 is defined by the flange 34 of the female sub 32. A counterbore 82 is formed in the end face 80, thereby defining an internal annular shoulder 84 of the female sub 32. An internal annular shoulder 85 is formed in the interior of the female sub 32 at the end portion opposing the flange 34. An annular groove 86 is formed in the interior of the female sub 32, and is adjacent the internal annular shoulder 85. An internal seal ring 87 engages the internal annular shoulder 85, and extends within the annular groove 86.

As shown in FIG. 4, the pressure relief valve assembly 20 further includes a rupture disc 88, which is clamped between the male sub 28 and the female sub 32, as will be described in further detail below. The rupture disc 88 includes an annular mounting portion 89 and a domed rupture portion 90 about which the mounting portion 89 circumferentially extends. In an exemplary embodiment, the rupture disc 88 is composed of one or more materials, one of which is Inconel Alloy 600 to provide corrosion protection for a variety of corrosive media, as well as excellent low temperature behavior. In an exemplary embodiment, the rupture disc 88 is composed of one or more other materials.

In an exemplary embodiment, when the pressure relief valve assembly 20 is in the assembled condition shown in FIGS. 2, 3, and 4, each of the one or more retainer segments 46 extends within the wing nut 26 and the respective external shoulders 58 engage the internal annular shoulder 56 of the wing nut 26. Thus, the one or more retainer segments 46 are secured to the wing nut 26 by being axially trapped between the retainer ring 48 and the respective engagements between the external shoulders 58 and the internal annular shoulder 56. The external annular shoulder 66 of the male sub 28 engages, or is adapted to engage, the respective end faces 60 of the one or more retainer segments 46. As a result, the wing nut 26, and the one or more retainer segments 46, are secured to the male sub 28 by being axially trapped between the flange 30 and the external annular shoulder 66. The wing nut 26, along with the one or more retainer segments 46, are permitted to slide axially along the male sub 28, but they remain secured to the male sub 28 due to the axial trapping of the one or more retainer segments 46 between the flange 30 and the external annular shoulder 66.

The rupture disc 88 extends within the counterbores 70 and 82, and the annular mounting portion 89 engages the internal annular shoulders 72 and 84. The rupture disc 88 is positioned axially between the internal fluid passages 61 and 78. A sub connection 91 connects the male sub 28 to the female sub 32, with the sub connection 91 including the flanges 30 and 34 and the fasteners 38, each of which extends through a pair of coaxial through-openings formed through the flanges 30 and 34, respectively (some of the through-openings formed through the flange 30 are shown in FIG. 2). In an exemplary embodiment, each through-opening formed through the flange 30 includes an internal threaded connection, with which the corresponding fastener 38 is threadably engaged. As a result of the connection between the flanges 30 and 34, the male sub 28 and the female sub 32 are connected to each other, the rupture disc 88 is clamped between the male sub 28 and the female sub 32, the sealing element 76 sealingly engages the side of the annular mounting portion 89 that engages the internal annular shoulder 72, and the end faces 68 and 80 engage each other, or are at least adjacent or proximate each other.

In an exemplary embodiment, when the pressure relief valve assembly 20 is in the assembled condition shown in FIGS. 2, 3, and 4, at least the portion of the male sub 28 that excludes the flange 30 is a male part of a hammer union, and the combination of the wing nut 26, the one or more retainer segments 46, and the retainer ring 48 form the nut part of the hammer union; this male part of the hammer union is adapted to be connected, using this nut part, to a female part of the hammer union, the female part including components that are equivalent to the seal ring 87 and at least the portion of the female sub 32 that excludes the flange 34; in several exemplary embodiments, the foregoing male, female, and nut parts are male, female, and nut parts of a Weco® style hammer union.

In an exemplary embodiment, when the pressure relief valve assembly 20 is in the assembled condition shown in FIGS. 2, 3, and 4, at least the portion of the female sub 32 that excludes the flange 34, and the seal ring 87, forms a female part of a hammer union; this female part of the hammer union is adapted to be connected to a male part of the hammer union via a nut part of the hammer union; this male part of the hammer union includes components that are equivalent to at least the portion of the male sub 28 that excludes the flange 30, and this nut part of the hammer union includes components that are equivalent to the combination of the wing nut 26, the one or more retainer segments 46, and the retainer ring 48; in several exemplary embodiments, the foregoing male, female, and nut parts are male, female, and nut parts of a Weco® style hammer union.

In several exemplary embodiments, the one or more retainer segments 46 and the retainer ring 48 permit the assembly of the pressure relief valve assembly 20 in accordance with the foregoing. More particularly, due to the flange 30, the male sub 28 is not able to move through the wing nut 26 in a left-to-right direction, as viewed in FIG. 4, so that the external annular shoulder 58 engages the internal annular shoulder 56. Instead, to assemble the pressure relief valve assembly 20, in several exemplary embodiments, the end portion of the male sub 28 opposing the flange 30 is inserted through the wing nut 26, in a right-to-left direction as viewed in FIG. 4, so that the external annular shoulder 66 moves past the wing nut 106; at this point, the one or more retainer segments 46 are concentrically disposed around the male sub 28, radially between the male sub 28 and the wing nut 26, and axially between the external annular shoulder 66 and the internal annular shoulder 56, and the retainer ring 48 is used to hold the one or more retainer segments 46 together. The male sub 28 is then permitted to move axially, in a left-to-right direction as viewed in FIG. 4, until the respective external annular shoulders 58 of the one or more retainer segments 46 engage the internal annular shoulder 56 of the wing nut 106. The male sub 28 is also permitted to move axially, in a right-to-left direction as viewed in FIG. 4, until the flange 30 of the male sub 28 engages the end portion 52 of the wing nut 106.

In operation, in several exemplary embodiments, with continuing reference to FIGS. 1, 2, 3, and 4, the pump assembly 12 (FIG. 1) draws fluid therein and discharges the fluid at a substantially higher pressure. During this operation of the pump assembly 12, the internal fluid passage 61 is in fluid communication with the pump assembly 12, and fluid pressure within the internal fluid passage 61 is exerted on the rupture disc 88 of the pressure relief valve assembly 20 in at least a direction 92, which is indicated by the left-to-right arrow 92 in FIG. 4. The sealing engagement, between the sealing element 76 and the side of the mounting portion 89 that engages the internal annular shoulder 72, prevents, or at least resists, the fluid from flowing through the internal fluid passage 61, around the rupture disc 88, and into the internal fluid passage 78. During the operation of the pump assembly 12, when the fluid pressure within the internal fluid passage 61 reaches or exceeds a predetermined pressure value, causing a predetermined pressure differential across the rupture disc 88, the rupture portion 90 of the rupture disc 88 ruptures. As a result, the internal fluid passage 78 is in fluid communication with the internal fluid passage 61, and the pressure relief valve assembly 20 permits fluid to flow through the internal fluid passage 61, through the annular mounting portion 89 of the rupture disc 88, and through the internal fluid passage 78. This fluid flow is in the direction 92. This fluid flow reduces or relieves the pressure within the pump assembly 12. As a result, the pressure relief valve assembly 20 operates to relieve the pressure within the pump assembly 12, preventing a further increase in pressure so as to prevent or otherwise substantially reduce the likelihood of damage to the pump assembly 12, one or more other components of the pumping system 10, and/or any system(s) in fluid communication therewith.

During operation, in several exemplary embodiments, after the rupture disc 88 ruptures, the diameter D2 being at least 25% greater than the diameter D1 increases the likelihood that shrapnel from the ruptured rupture disc 88 will flow out of the female sub 32 without creating a pressure spike.

Figure 5:
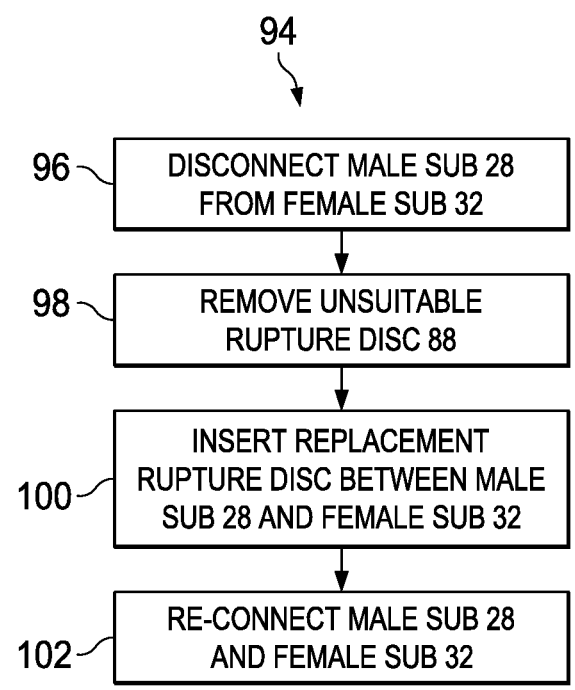
FIG. 5 is a flow chart illustration of a method of retrofitting the pressure relief valve assembly of FIGS. 2-4, according to an exemplary embodiment.

In an exemplary embodiment, as illustrated in FIG. 5 with continuing reference to FIGS. 1, 2, 3, and 4, a method of retrofitting the pressure relief valve assembly 20 is generally referred to by the reference numeral 94. In several exemplary embodiments, the method 94 is executed when the rupture disc 88 is deemed unsuitable. In an exemplary embodiment, the rupture disc 88 is deemed unsuitable after it has ruptured in accordance with the foregoing operation of the pressure relief valve assembly 20. In an exemplary embodiment, the rupture disc 88 is deemed unsuitable after it has been in the field for a predetermined service life.

The method includes a step 96, at which the male sub 28 and the female sub 32 are disconnected from one another. At the step 96, in an exemplary embodiment, the fasteners 38 are threadably disengaged from the respective internal threaded connections in the through-openings formed in the flange 30. After the step 96, at step 98 the unsuitable rupture disc 88 is removed from the pressure relief valve assembly 20. At step 100, a replacement rupture disc, which is identical to the rupture disc 88, is inserted between the male sub 28 and the female sub 32. At step 102, the male sub 28 and the female sub 32 are re-connected to each other.

In an exemplary embodiment, at the step 102, the replacement rupture disc extends within the counterbores 70 and 82, and the annular mounting portion 89 of the replacement rupture disc engages the internal annular shoulders 72 and 84. The flanges 30 and 34 are connected together via the fasteners 38, each of which are re-inserted through a pair of coaxial through-openings formed through the flanges 30 and 34, respectively. In an exemplary embodiment, each through-opening formed through the flange 30 includes an internal threaded connection, with which the corresponding fastener 38 is threadably engaged. As a result of the connection between the flanges 30 and 34, the replacement rupture disc is clamped between the male sub 28 and the female sub 32, the sealing element 76 sealingly engages the side of the annular mounting portion 89 of the replacement rupture disc that engages the internal annular shoulder 72, and the end faces 68 and 80 engage each other, or are at least adjacent or proximate each other.

In several exemplary embodiments, as established by the execution of the method 94, the pressure relief valve assembly 20 provides a re-kittable housing. More particularly, after the rupture disc 88 ruptures, the pressure relief valve assembly 20 can be re-used by retrofitting the pressure relief valve assembly 20, that is, by replacing the unsuitable rupture disc 88 with a replacement rupture disc identical thereto. Therefore, the total cost of ownership is reduced because an operator only has to replace the unsuitable rupture disc 88 and does not have to replace the entire pressure relief valve assembly 20, which assembly costs more than a replacement rupture disc that is identical to the rupture disc 88. Thus, the pressure relief valve assembly 20 lowers costs associated with pressure relief efforts.

In several exemplary embodiments, at least the wing nut 26, the one or more retainer segments 46, the retainer ring 48, the end face 62, the frusto-conical surface 64, and the external annular shoulder 66 are omitted from the pressure relief valve assembly 20, in favor of a combination of an external threaded connection, an internal annular shoulder, an annular groove, and an internal seal ring, which axially oppose the flange 30 and are similar to the external threaded connection 36, the internal annular shoulder 85, the annular groove 86, and the seal ring 87, respectively; in such exemplary embodiments, the male sub 28 may instead be referred to as female sub 28 and thus the pressure relief valve assembly 20 includes female subs 28 and 32.

In several exemplary embodiments, at least the combination of the external threaded connection 36, the internal annular shoulder 85, the annular groove 86, and the seal ring 87 are omitted from the pressure relief valve assembly 20, in favor of a combination of a wing nut, one or more retainer segments, a retainer ring, an end face, a frusto-conical surface, and an external annular shoulder, which axially oppose the flange 34 and are similar to the wing nut 26, the one or more retainer segments 46, the retainer ring 48, the end face 62, the frusto-conical surface 64, and the external annular shoulder 66, respectively; in such exemplary embodiments, the female sub 32 may instead be referred to as male sub 32 and thus the pressure relief valve assembly 20 includes male subs 28 and 32.

In several exemplary embodiments, at least the wing nut 26, the one or more retainer segments 46, the retainer ring 48, the end face 62, the frusto-conical surface 64, and the external annular shoulder 66 are omitted from the pressure relief valve assembly 20, in favor of a combination of an external threaded connection, an internal annular shoulder, an annular groove, and an internal seal ring, which axially oppose the flange 30 and are similar to the external threaded connection 36, the internal annular shoulder 85, the annular groove 86, and the seal ring 87, respectively; moreover, at least the combination of the external threaded connection 36, the internal annular shoulder 85, the annular groove 86, and the seal ring 87 are omitted from the pressure relief valve assembly 20, in favor of a combination of a wing nut, one or more retainer segments, a retainer ring, an end face, a frusto-conical surface, and an external annular shoulder, which axially oppose the flange 34 and are similar to the wing nut 26, the one or more retainer segments 46, the retainer ring 48, the end face 62, the frusto-conical surface 64, and the external annular shoulder 66, respectively; in such exemplary embodiments, the male sub 28 may instead be referred to as female sub 28, the female sub 32 may instead be referred to as male sub 32, and thus the pressure relief valve assembly 20 includes female sub 28 and male sub 32.

Figure 6:
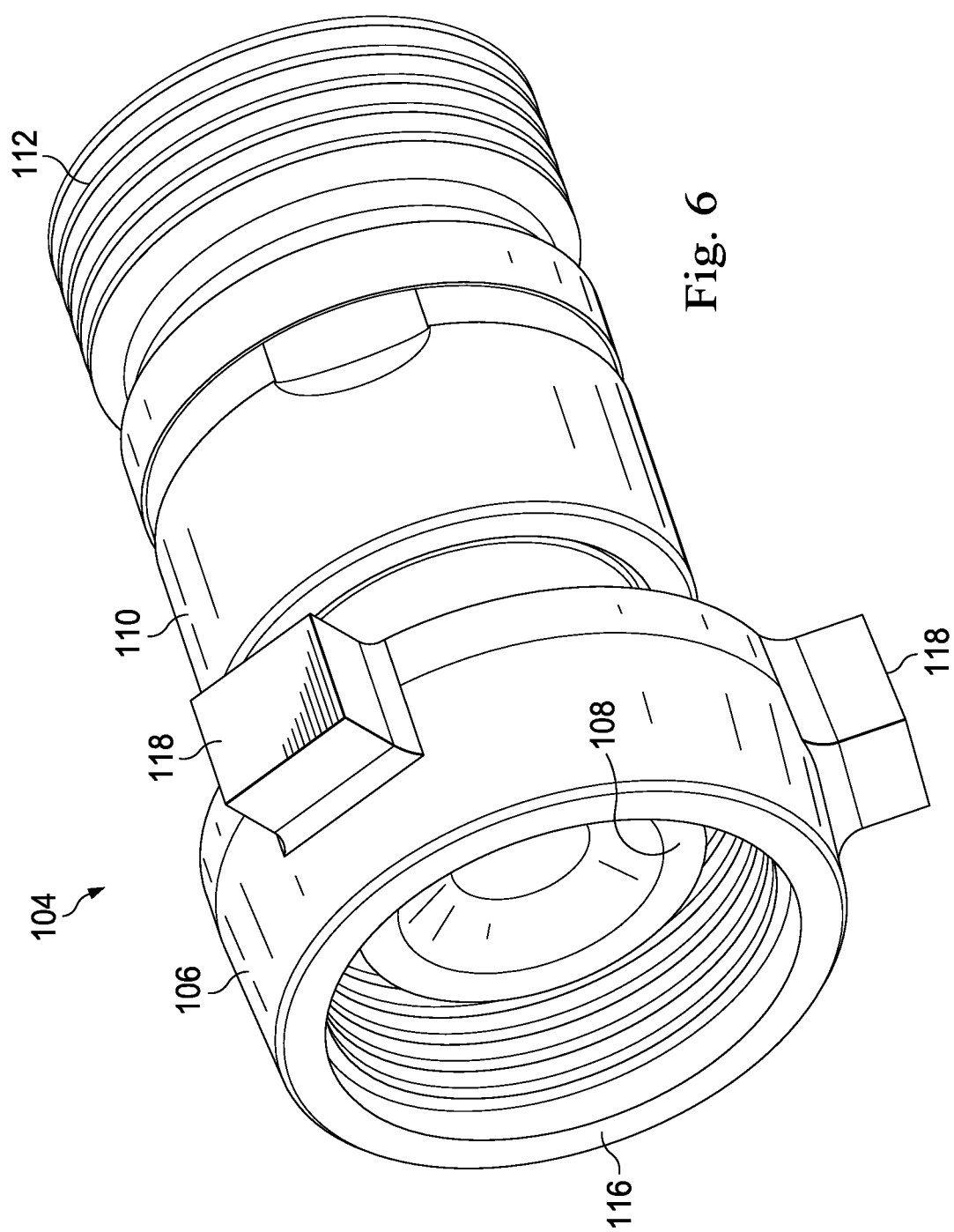
FIG. 6 is a perspective view of a pressure relief valve assembly according to an exemplary embodiment and suitable as a substitute for the pressure relief valve assembly of FIGS. 2-4 in the pumping system of FIG. 1.
Figure 7:
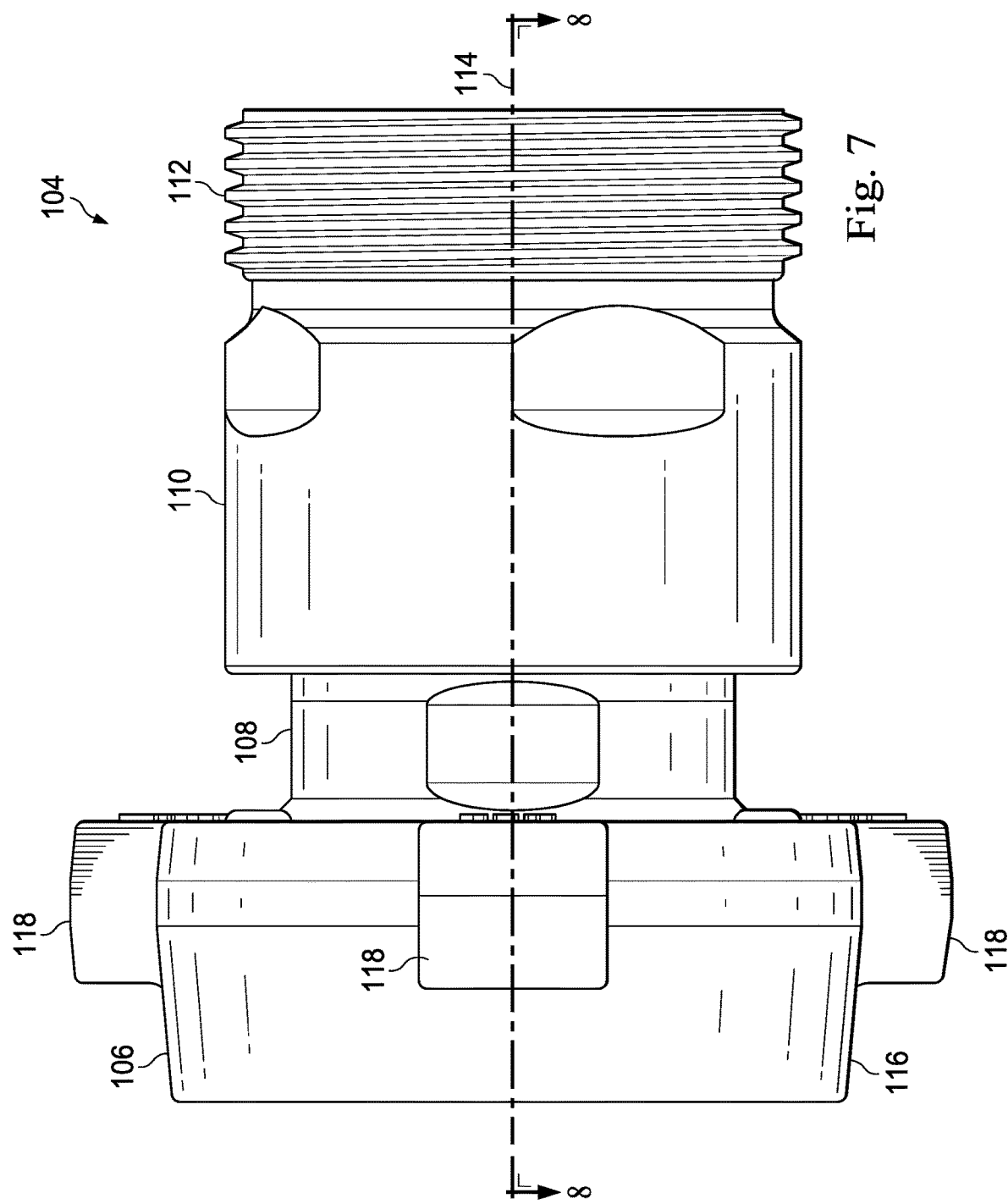
FIG. 7 is a side view of the pressure relief valve assembly of FIG. 6, according to an exemplary embodiment.

In an exemplary embodiment, as illustrated in FIGS. 6 and 7 with continuing reference to FIG. 1, a pressure relief valve assembly is generally referred to by the reference numeral 104. In the pumping system 10, in several exemplary embodiments, the pressure relief valve assembly 20 is omitted in favor of the pressure relief valve assembly 104. In several exemplary embodiments, the pressure relief valve assembly 104 is a substitute for the pressure relief valve assembly 20.

As shown in FIGS. 6 and 7, the pressure relief valve assembly 104 includes a wing nut 106, a male sub 108, and a female sub 110 including an external threaded connection 112 at one end portion thereof. In several exemplary embodiments, the male sub 108 may be referred to as a "first sub," and the female sub 110 may be referred to as a "second sub." Alternatively, in several exemplary embodiments, the female sub 110 may be referred to as a "first sub," and the male sub 108 may be referred to as a "second sub." A longitudinally-extending center axis 114 is defined by the pressure relief valve assembly 104. The wing nut 106 includes an annular body 116 and a plurality of circumferentially-spaced lugs 118 extending radially outward from the annular body 116.

Figure 8:
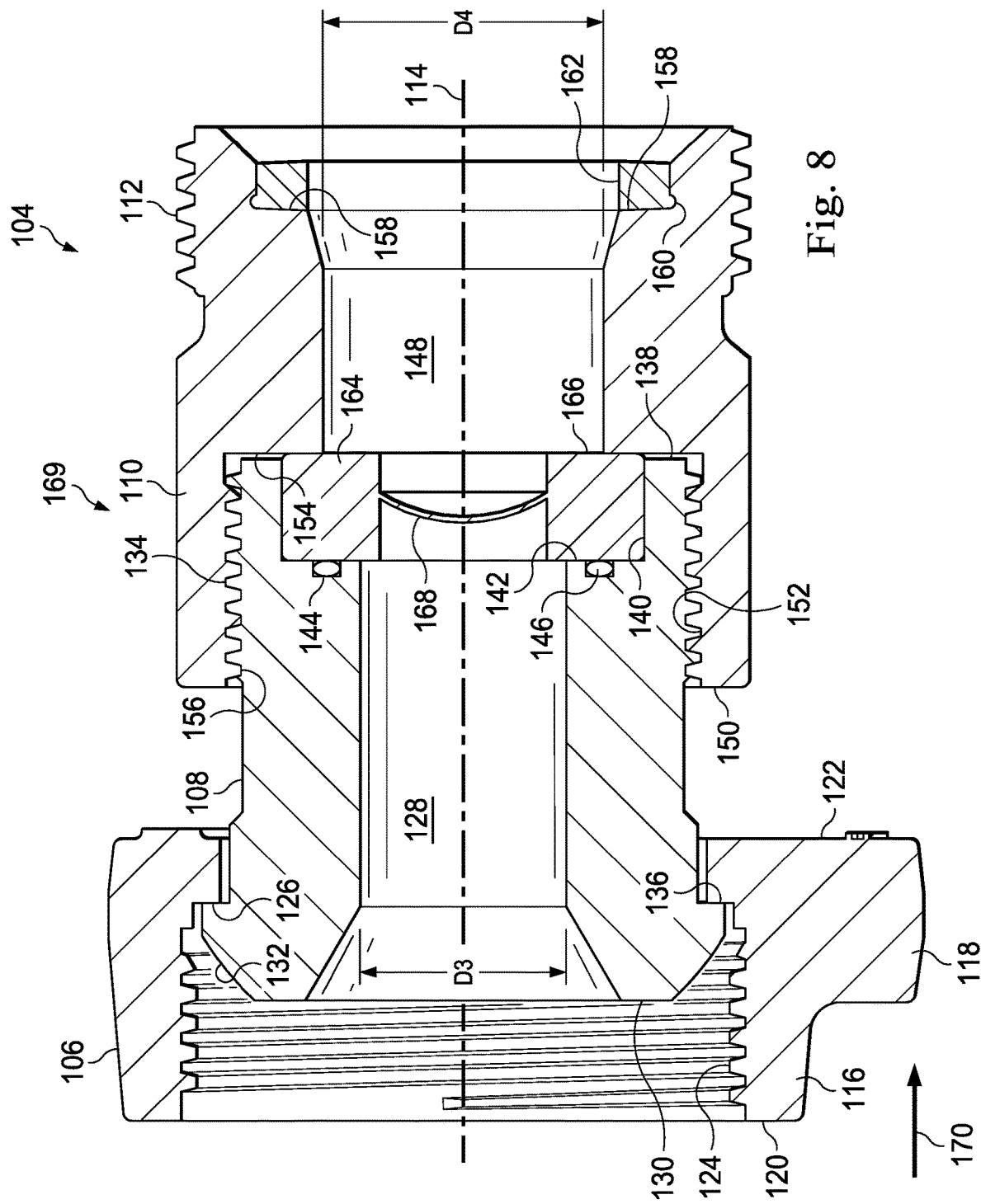
FIG. 8 is a section view of the pressure relief valve assembly of FIGS. 6 and 7 taken along line 8-8 of FIG. 7, according to an exemplary embodiment.

In an exemplary embodiment, as illustrated in FIG. 8 with continuing reference to FIGS. 1, 6, and 7, the annular body 116 of the wing nut 106 includes opposing end portions 120 and 122, and an internal threaded connection 124 formed in the interior of the annular body 116 and adjacent, or at least proximate, the end portion 120. An internal annular shoulder 126 is defined in the interior of the annular body 116 at an axial position between the internal threaded connection 124 and the end portion 122.

An internal fluid passage 128 having a diameter D3 is defined by the male sub 108. In an exemplary embodiment, the diameter D3 is 2 inches. The internal fluid passage 128 is substantially coaxial with the axis 114. An axially-facing end face 130 is also defined by the male sub 108 at one end thereof. A frusto-conical surface 132 of the male sub 108 extends angularly away from the end face 130. The male sub 108 further includes an external threaded connection 134 at the end portion thereof opposing the end face 130. An external annular shoulder 136 is formed in the exterior of the male sub 108 at the end portion thereof opposing the external threaded connection 134; as a result, the external annular shoulder 136 is axially positioned between the frusto-conical surface 132 and the external threaded connection 134. An axially-facing end face 138 opposes the end face 130. The external threaded connection 134 is adjacent the end face 138. A counterbore 140 is formed in the end face 138, thereby defining an internal annular shoulder 142 of the male sub 108. An annular groove 144 is formed in the internal annular shoulder 142. A sealing element 146, such as an O-ring, extends within the annular groove 144.

An internal fluid passage 148 having a diameter D4 is defined by the female sub 110. In an exemplary embodiment, as shown in FIG. 8, the diameter D4 is greater than the diameter D3. In an exemplary embodiment, the diameter D4 is 2.75 inches. In an exemplary embodiment, the diameter D3 is 2 inches, and the diameter D4 is 2.75 inches. In an exemplary embodiment, the diameter D4 is at least 25% greater than the diameter D3 (D4 is at least 1.25× of D3). In an exemplary embodiment, the diameter D4 is about 25% to about 50% greater than the diameter D3 (D4 is about 1.25× to about 1.50× of D3). The internal fluid passage 148 is substantially coaxial with the axis 114 and thus with the internal fluid passage 128. An axially-facing end face 150 opposes the end face to which the external threaded connection 112 is adjacent. A counterbore 152 is formed in the end face 150, thereby defining an internal annular shoulder 154 of the female sub 110. An internal threaded connection 156 is formed in the interior of the female sub 110 at the counterbore 152 thereof, the internal threaded connection 156 extending between the end face 150 and the internal annular shoulder 154.

An internal annular shoulder 158 is formed in the interior of the female sub 110 at the end portion opposing the end face 150, that is, the end portion to which the external threaded connection 112 is adjacent. An annular groove 160 is formed in the interior of the female sub 110, and is adjacent the internal annular shoulder 158. An internal seal ring 162 engages the internal annular shoulder 158, and extends within the annular groove 160.

As shown in FIG. 8, the pressure relief valve assembly 104 further includes a rupture disc 164, which is clamped between the male sub 108 and the female sub 110, as will be described in further detail below. The rupture disc 164 includes an annular mounting portion 166 and a domed rupture portion 168 around which the mounting portion 166 circumferentially extends. In an exemplary embodiment, the rupture disc 164 is composed of one or more materials, one of which is Inconel Alloy 600 to provide corrosion protection for a variety of corrosive media, as well as excellent low temperature behavior. In an exemplary embodiment, the rupture disc 164 is composed of one or more other materials.

In an exemplary embodiment, when the pressure relief valve assembly 104 is in the assembled condition shown in FIGS. 6, 7, and 8, the external annular shoulder 136 of the male sub 108 engages, or is adapted to engage, the internal annular shoulder 126 of the wing nut 106. As a result, the wing nut 106 is secured to the male sub 108 by being axially trapped between the end face 150 and the external annular shoulder 136. The wing nut 106 is permitted to slide axially along the male sub 108, but remains secured to the male sub 108 due to the axial trapping of the wing nut 106 between the end face 150 and the external annular shoulder 136.

The rupture disc 164 extends within the counterbores 140 and 152, and the annular mounting portion 166 engages the internal annular shoulders 142 and 154. The rupture disc 104 is positioned axially between the internal fluid passages 128 and 148. A sub connection 169 connects the male sub 108 to the female sub 110, with the sub connection 169 including the external threaded connection 134, which threadably engages the internal threaded connection 156 of the female sub 110. As a result of the threaded engagement between the external threaded connection 134 and the internal threaded connection 156, the male sub 108 and the female sub 110 are connected to each other, the rupture disc 164 is clamped between the male sub 108 and the female sub 110, the sealing element 146 sealingly engages the side of the annular mounting portion 166 that engages the internal annular shoulder 142, and the end face 138 engages, is adjacent, or is proximate, the internal annular shoulder 154.

In an exemplary embodiment, when the pressure relief valve assembly 104 is in the assembled condition shown in FIGS. 6, 7, and 8, at least the portion of the male sub 108 that excludes the external threaded connection 134 is a male part of a hammer union, and the wing nut 106 is a nut part of the hammer union; this male part of the hammer union is adapted to be connected, using this nut part, to a female part of the hammer union, the female part including components that are equivalent to the seal ring 162 and at least the portion of the female sub 110 that includes the external threaded connection 112; in several exemplary embodiments, the foregoing male, female, and nut parts are male, female, and nut parts of a Weco® style hammer union.

In an exemplary embodiment, when the pressure relief valve assembly 104 is in the assembled condition shown in FIGS. 6, 7, and 8, at least the portion of the female sub 110 that includes the external threaded connection 112, and the seal ring 162, form a female part of a hammer union; this female part of the hammer union is adapted to be connected to a male part of the hammer union via a nut part of the hammer union; this male part of the hammer union includes components that are equivalent to at least the portion of the male sub 108 that excludes the external threaded connection 134, and this nut part of the hammer includes components that are equivalent to the wing nut 106; in several exemplary embodiments, the foregoing male, female, and nut parts are male, female, and nut parts of a Weco® style hammer union.

In several exemplary embodiments, one or more retainer segments and a retainer ring are not necessary to permit the assembly of the pressure relief valve assembly 104 in accordance with the foregoing. More particularly, due to the male sub 108 including the external threaded connection 134 (rather than a flange that is similar to the flange 30 of the male sub 28), the male sub 108 is able to move through the wing nut 106, in a left-to-right direction as viewed in FIG. 8, so that the external annular shoulder 136 engages the internal annular shoulder 126. In several exemplary embodiments, the connection between the male sub 108 and the female sub 110, via the threaded engagement between the external threaded connection 134 and the internal threaded connection 156, improves the process of assembling the pressure relief valve assembly 104 by reducing the amount of parts necessary for the assembly process, as well as reducing the time necessary to carry out the assembly process. In several exemplary embodiments, these part and time reductions also lower costs associated with pressure relief efforts.

In operation, in several exemplary embodiments, with continuing reference to FIGS. 1, 6, 7, and 8, when the pressure relief valve assembly 104 is substituted for the pressure relief valve assembly 20, the pump assembly 12 (FIG. 1) draws fluid therein and discharges the fluid at a substantially higher pressure. During this operation of the pump assembly 12, the internal fluid passage 128 is in fluid communication with the pump assembly 12, and fluid pressure within the internal fluid passage 128 is exerted on the rupture disc 164 of the pressure relief valve assembly 104 in at least a direction 170, which is indicated by the left-to-right arrow 170 in FIG. 8. The sealing engagement, between the sealing element 146 and the side of the mounting portion 166 that engages the internal annular shoulder 142, prevents, or at least resists, the fluid from flowing through the internal fluid passage 128, around the rupture disc 164, and into the internal fluid passage 148. During the operation of the pump assembly 12, when the fluid pressure within the internal fluid passage 128 reaches or exceeds a predetermined pressure value, causing a predetermined pressure differential across the rupture disc 164, the rupture portion 168 of the rupture disc 164 ruptures. As a result, the internal fluid passage 148 is in fluid communication with the internal fluid passage 128, and the pressure relief valve assembly 104 permits fluid to flow through the internal fluid passage 128, through the annular mounting portion 166 of the rupture disc 164, and through the internal fluid passage 148. This fluid flow is in the direction 170. This fluid flow reduces or relieves the pressure within the pump assembly 12. As a result, the pressure relief valve assembly 104 operates to relieve the pressure within the pump assembly 12, preventing a further increase in pressure so as to prevent or otherwise substantially reduce the likelihood of damage to the pump assembly 12, one or more other components of the pumping system 10, and/or any system(s) in fluid communication therewith.

During operation, in several exemplary embodiments, after the rupture disc 164 ruptures, the diameter D4 being at least 25% greater than the diameter D3 increases the likelihood that shrapnel from the ruptured rupture disc 164 will flow out of the female sub 110 without creating a pressure spike.

Figure 9:
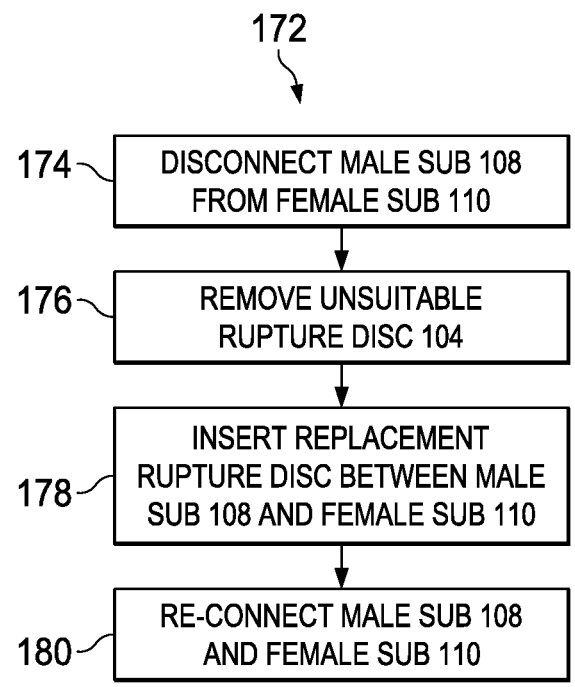
FIG. 9 is a flow chart illustration of a method of retrofitting the pressure relief valve assembly of FIGS. 6-8, according to an exemplary embodiment.

In an exemplary embodiment, as illustrated in FIG. 9 with continuing reference to FIGS. 1, 6, 7, and 8, a method of retrofitting the pressure relief valve assembly 104 is generally referred to by the reference numeral 172. In several exemplary embodiments, the method 172 is executed when the rupture disc 164 is deemed unsuitable. In an exemplary embodiment, the rupture disc 164 is deemed unsuitable after it has ruptured in accordance with the foregoing operation of the pressure relief valve assembly 104. In an exemplary embodiment, the rupture disc 164 is deemed unsuitable after it has been in the field for too long of time.

The method includes a step 174, at which the male sub 108 and the female sub 110 are disconnected from one another. At the step 174, in an exemplary embodiment, the internal threaded connection 156 is threadably disengaged from the external threaded connection 134. After the step 174, at step 176 the unsuitable rupture disc 104 is removed from the pressure relief valve assembly 104. At step 178, a replacement rupture disc, which is identical to the rupture disc 164, is inserted between the male sub 108 and the female sub 110. At step 180, the male sub 108 and the female sub 110 are re-connected to each other.

In an exemplary embodiment, at the step 180, the rupture disc 164 extends within the counterbores 140 and 152, and the annular mounting portion 166 engages the internal annular shoulders 142 and 154. The male sub 108 is connected to the female sub 110 by threadably engaging the external threaded connection 134 of the male sub 108 with the internal threaded connection 156 of the female sub 110. As a result, the male sub 108 and the female sub 110 are connected to each other, the rupture disc 164 is clamped between the male sub 108 and the female sub 110, the sealing element 146 sealingly engages the side of the annular mounting portion 166 that engages the internal annular shoulder 142, and the end face 138 engages, is adjacent, or is proximate, the internal annular shoulder 154.

In several exemplary embodiments, as established by the execution of the method 172, the pressure relief valve assembly 104 provides a re-kittable housing. More particularly, after the rupture disc 164 ruptures, the pressure relief valve assembly 104 can be re-used by retrofitting the pressure relief valve assembly 104, that is, by replacing the unsuitable rupture disc 164 with a replacement rupture disc identical thereto. Therefore, the total cost of ownership is reduced because an operator only has to replace the unsuitable rupture disc 164 and does not have to replace the entire pressure relief valve assembly 104, which assembly costs more than a replacement rupture disc that is identical to the rupture disc 164. Thus, the pressure relief valve assembly 104 lowers costs associated with pressure relief efforts.

In several exemplary embodiments, at least the wing nut 106, the end face 130, the frusto-conical surface 132, and the external annular shoulder 136 are omitted from the pressure relief valve assembly 104, in favor of a combination of an external threaded connection, an internal annular shoulder, an annular groove, and an internal seal ring, which axially oppose the end face 138 and are similar to the external threaded connection 112, the internal annular shoulder 158, the annular groove 160, and the seal ring 162, respectively; in such exemplary embodiments, the male sub 108 may instead be referred to as female sub 108 and thus the pressure relief valve assembly 104 includes female subs 108 and 110.

In several exemplary embodiments, at least the combination of the external threaded connection 112, the internal annular shoulder 158, the annular groove 160, and the seal ring 162 are omitted from the pressure relief valve assembly 104, in favor of a combination of at least a wing nut, an end face, a frusto-conical surface, and an external annular shoulder, which axially oppose the end face 150 and are similar to the wing nut 106, the end face 130, the frusto-conical surface 132, and the external annular shoulder 136, respectively; in such exemplary embodiments, the female sub 110 may instead be referred to as male sub 110 and thus the pressure relief valve assembly 20 includes male subs 108 and 110.

In several exemplary embodiments, at least the wing nut 106, the end face 130, the frusto-conical surface 132, and the external annular shoulder 136 are omitted from the pressure relief valve assembly 104, in favor of a combination of an external threaded connection, an internal annular shoulder, an annular groove, and an internal seal ring, which axially oppose the end face 138 and are similar to the external threaded connection 112, the internal annular shoulder 158, the annular groove 160, and the seal ring 162, respectively; moreover, at least the combination of the external threaded connection 112, the internal annular shoulder 158, the annular groove 160, and the seal ring 162 are omitted, in favor of a combination of a wing nut, an end face, a frusto-conical surface, and an external annular shoulder, which axially oppose the end face 150 and are similar to the wing nut 106, the end face 130, the frusto-conical surface 132, and the external annular shoulder 136, respectively; in such exemplary embodiments, the male sub 108 may instead be referred to as female sub 108, the female sub 110 may instead be referred to as male sub 110, and thus the pressure relief valve assembly 104 includes female sub 108 and male sub 110.

Figure 10:
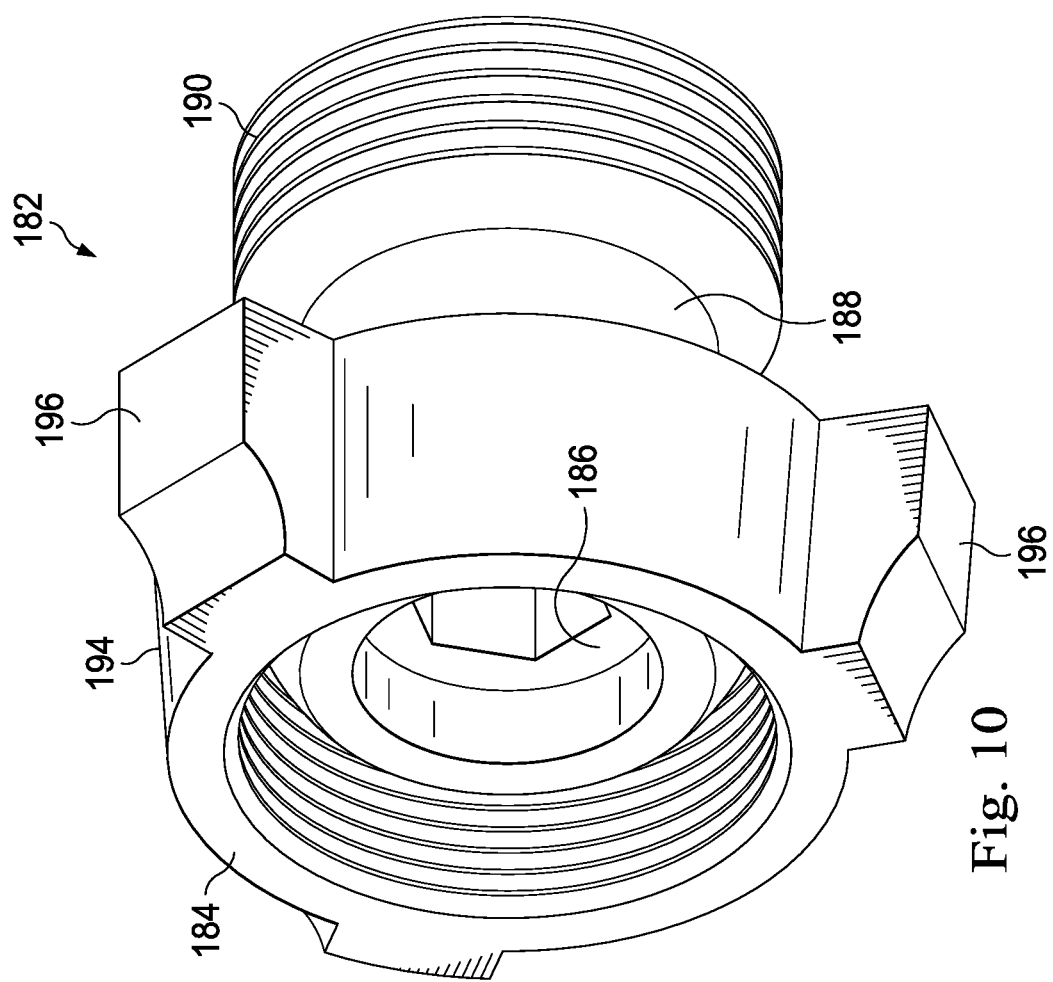
FIG. 10 is a perspective view of a pressure relief valve assembly according to an exemplary embodiment and suitable as a substitute for the pressure relief valve assembly of FIGS. 2-4 and/or FIGS. 6-8 in the pumping system of FIG. 1.
Figure 11:
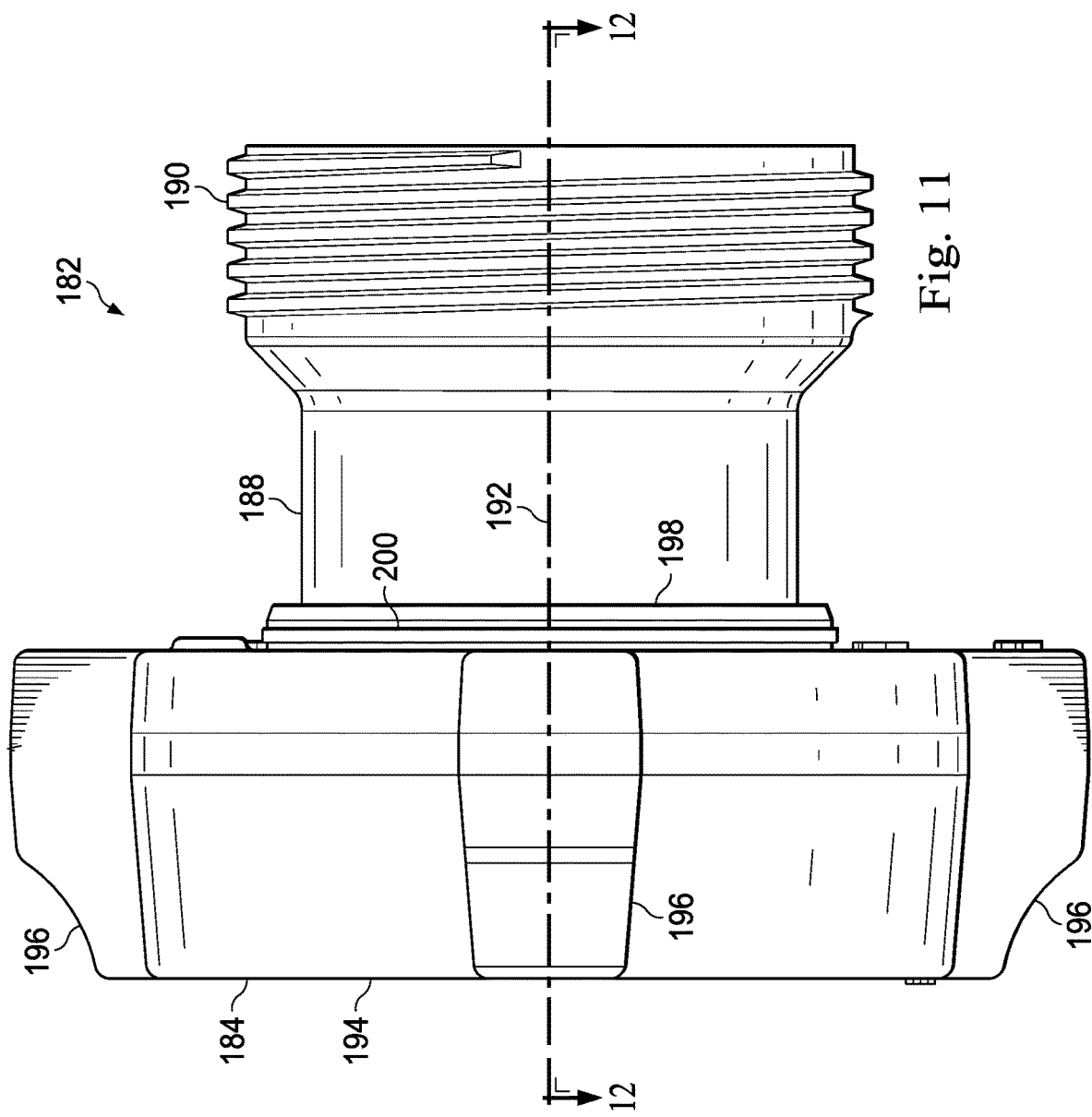
FIG. 11 is a side view of the pressure relief valve assembly of FIG. 10, according to an exemplary embodiment.

In an exemplary embodiment, as illustrated in FIGS. 10 and 11 with continuing reference to FIG. 1, a pressure relief valve assembly is generally referred to by the reference numeral 182. In the pumping system 10, in several exemplary embodiments, the pressure relief valve assemblies 20 and/or 104 are omitted in favor of the pressure relief valve assembly 182. In several exemplary embodiments, the pressure relief valve assembly 182 is a substitute for the pressure relief valve assemblies 20 and/or 104.

As shown in FIGS. 10 and 11, the pressure relief valve assembly 182 includes a wing nut 184, a retainer nut 186, and a body 188 including an external threaded connection 190 at one end portion thereof. In several exemplary embodiments, the retainer nut 186 may be referred to as a "first sub," and the body 188 may be referred to as a "second sub." Alternatively, in several exemplary embodiments, the body 188 may be referred to as a "first sub," and the retainer nut 186 may be referred to as a "second sub." A longitudinally-extending center axis 192 is defined by the pressure relief valve assembly 182. The wing nut 184 includes an annular body 194 and a plurality of circumferentially-spaced lugs 196 extending radially outward from the annular body 194.

Figure 12:
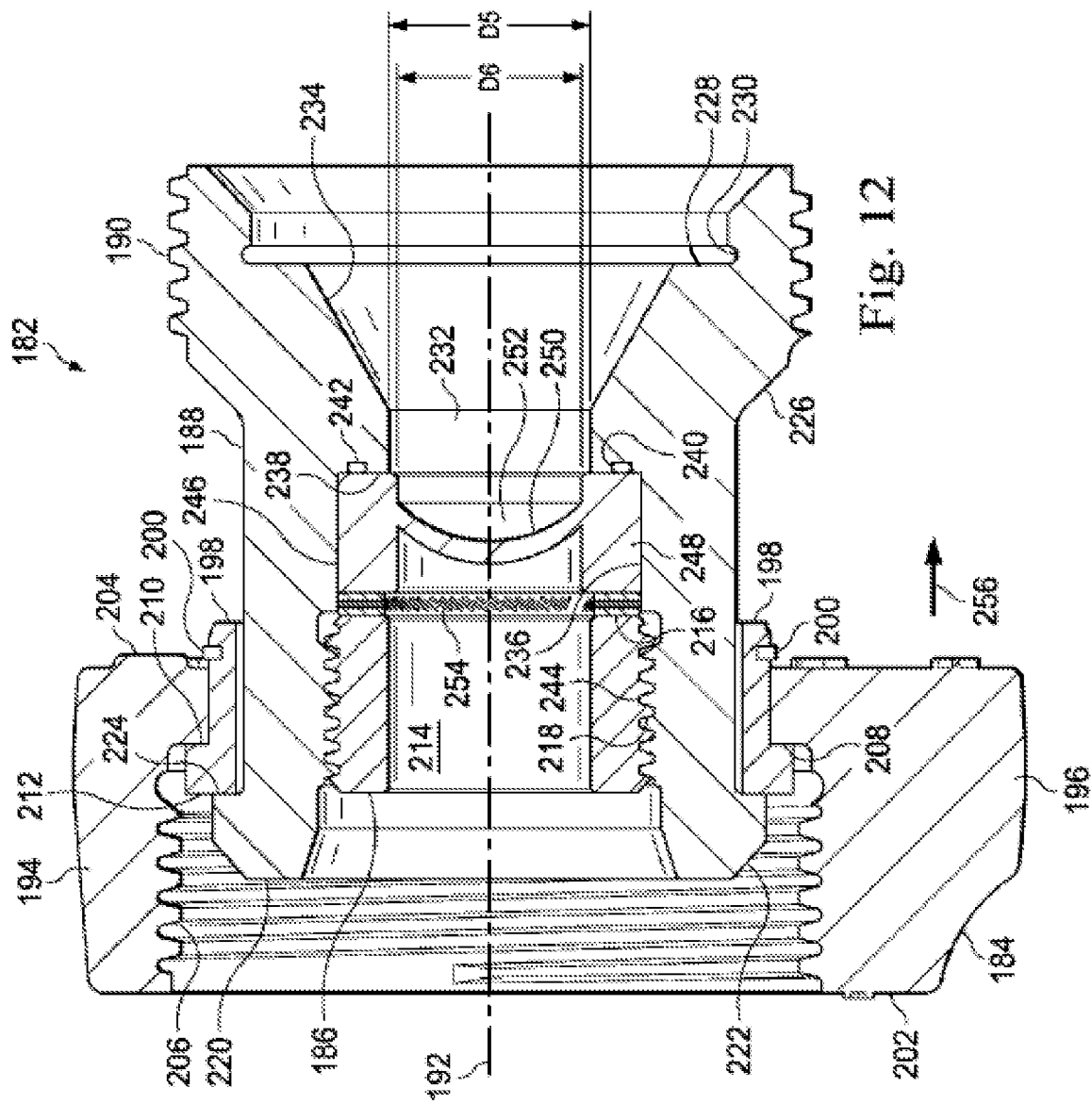
FIG. 12 is a section view of the pressure relief valve assembly of FIGS. 10 and 11 taken along line 12-12 of FIG. 3, according to an exemplary embodiment.

In an exemplary embodiment, as illustrated in FIGS. 11 and 12 with continuing reference to FIGS. 1 and 10, the pressure relief valve assembly 182 further includes one or more circumferentially-extending retainer segments 198 concentrically disposed about the body 188. The one or more retainer segments 198 are held together with a retainer ring 200, which extends circumferentially about the body 188.

In an exemplary embodiment, as illustrated most clearly in FIG. 12, with continuing reference to FIGS. 1, 10, and 11, the annular body 194 of the wing nut 184 includes opposing end portions 202 and 204, and an internal threaded connection 206 formed in the interior of the annular body 194 and adjacent, or at least proximate, the end portion 202. An internal annular shoulder 208 is defined in the interior of the annular body 194 at an axial position between the internal threaded connection 206 and the end portion 204. Each of the one or more retainer segments 198 extends within the wing nut 184 and includes respective external shoulders 210, which are axially spaced from the retainer ring 200 and engage the internal annular shoulder 208 of the wing nut 184. Respective end faces 212 are defined by the one or more retainer segments 198, and face axially in a direction away from the retainer ring 200.

The retainer nut 186 defines an internal fluid passage 214. The internal fluid passage 214 is substantially coaxial with the center axis 192. The retainer nut 186 also defines an end face 216 at one end thereof. The end face 216 is an axially-facing surface. An external threaded connection 218 is formed in the exterior of the retainer nut 186 and extends between the opposing ends thereof. In several exemplary embodiments, the external threaded connection 218 extends adjacent, or at least proximate, the end face 216 of the retainer nut 186.

The body 188 defines an end face 220 at the end thereof opposing the external threaded connection 190. The end face 220 is an axially-facing surface. A frusto-conical surface 222 of the body 188 extends angularly away from the end face 220. An external annular shoulder 224 is formed in the exterior of the body 188, axially between the frusto-conical surface 222 and the external threaded connection 190. Moreover, a frusto-conical surface 226 is formed in the exterior of the body 188, axially between the external annular shoulder 224 and the external threaded connection 190. An internal annular shoulder 228 is formed in the interior of the body 188 at the end portion opposing the end face 220. The internal annular shoulder 228 is an axially-facing surface. An annular groove 230 is formed in the interior of the body 188, adjacent the internal annular shoulder 228. An internal seal ring (not shown) engages the internal annular shoulder 228, and extends within the annular groove 230.

An internal fluid passage 232 having a diameter D5 is defined by the body 188. In an exemplary embodiment, the diameter D5 is 2.5 inches. The internal fluid passage 232 is substantially coaxial with the center axis 192. A frusto-conical surface 234 is formed in the interior of the body 188, axially between the internal annular shoulder 228 and the internal fluid passage 232. In several exemplary embodiments, the frusto-conical surface 234 adjoins both the internal annular shoulder 228 and the internal fluid passage 232. A counterbore 236 is formed in the body 188, thereby defining an internal annular shoulder 238 of the body 188. The internal annular shoulder 238 is an axially-facing surface. The internal annular shoulder 238 adjoins the internal fluid passage 232, opposite the frusto-conical surface 234. An annular groove 240 is formed in the internal annular shoulder 238. A sealing element 242, such as an O-ring, extends within the annular groove 240. An internal threaded connection 244 is formed in the interior of the body 188 at the counterbore 236, axially between the internal annular shoulder 238 and the end face 220.

As shown in FIG. 12, the pressure relief valve assembly 182 further includes a rupture disc 246, which is clamped between the retainer nut 186 and the body 188, as will be described in further detail below. The nut 186 is entirely contained within the bore of the body 188 when it is threadably engaged with the body counterbore. The rupture disc 246 includes an annular mounting portion 248 and a domed rupture portion 250 about which the mounting portion 248 circumferentially extends. An internal fluid passage 252 having a diameter D6 is defined by the annular mounting portion 248. The internal fluid passage 252 is substantially coaxial with the center axis 192 and thus with the internal fluid passage 232. The domed rupture portion 250 blocks fluid flow through the internal fluid passage 252 until the domed rupture portion 250 ruptures, as will be discussed in further detail below.

In an exemplary embodiment, as shown in FIG. 12, the diameter D6 is less than the diameter D5. In an exemplary embodiment, the diameter D6 is 2 inches. In an exemplary embodiment, the diameter D5 is 2.5 inches, and the diameter D6 is 2 inches. In an exemplary embodiment, the diameter D5 is at least 25% greater than the diameter D6 (D5 is at least 1.25× of D6). In an exemplary embodiment, the diameter D5 is about 25% to about 50% greater than the diameter D6 (D5 is about 1.25× to about 1.50× of D6). In an exemplary embodiment, the rupture disc 246 is composed of one or more materials, one of which is Inconel Alloy 600 to provide corrosion protection for a variety of corrosive media, as well as excellent low temperature behavior. In an exemplary embodiment, the rupture disc 246 is composed of one or more other materials.

In an exemplary embodiment, when the pressure relief valve assembly 182 is in the assembled condition shown in FIGS. 10, 11, and 12, each of the one or more retainer segments 198 extends within the wing nut 184 and the respective external shoulders 210 engage the internal annular shoulder 208 of the wing nut 184. Thus, the one or more retainer segments 198 are secured to the wing nut 184 by being axially trapped between the retainer ring 200 and the respective engagements between the external shoulders 210 and the internal annular shoulder 208. The external annular shoulder 224 of the body 188 engages, or is adapted to engage, the respective end faces 212 of the one or more retainer segments 198. As a result, the wing nut 184, and the one or more retainer segments 198, are secured to the body 188 by being axially trapped between the frusto-conical surface 226 and the external annular shoulder 224. The wing nut 184, along with the one or more retainer segments 198, are permitted to slide axially along the body 188, but they remain secured to the body 188 due to the axial trapping of the one or more retainer segments 198 between the frusto-conical surface 226 and the external annular shoulder 224.

The rupture disc 246 extends within the counterbore 236. In several exemplary embodiments, a washer 254, such as, for example, a Nord-Lock® washer also extends within the counterbore 236, adjacent the rupture disc 246. The retainer nut 186 is connected to the body 188 via threaded engagement between the external threaded connection 218 and the internal threaded connection 244. Accordingly, both the washer 254 and the annular mounting portion 248 of the rupture disc 246 are clamped between the retainer nut 186 and the body 188. In this position, the rupture disc 246 is located axially between the internal fluid passages 214 and 232. The side of the annular mounting portion 248 opposing the washer 254 engages the internal annular shoulder 238 of the body 188. Moreover, the washer 254 is engaged by the end face 216 of the retainer nut 186 and the side of the annular mounting portion 248 opposing the internal annular shoulder 238. As a result of the connection between the retainer nut 186 and the body 188, the sealing element 242 sealingly engages the side of the annular mounting portion 248 that engages the internal annular shoulder 238, and the washer 254 prevents, or at least obstructs, the external threaded connection 218 from threadably disengaging the internal threaded connection 244.

In an exemplary embodiment, when the pressure relief valve assembly 182 is in the assembled condition shown in FIGS. 10, 11, and 12, at least the portion of the body 188 that excludes the frusto-conical surface 226 and the external threaded connection 190 is a male part of a hammer union, and the combination of the wing nut 184, the one or more retainer segments 198, and the retainer ring 200 form a nut part of the hammer union. This male part of the hammer union is adapted to be connected, using this nut part, to a female part of the hammer union, the female part including components that are equivalent to the seal ring (not shown) and at least the portion of the body 188 that excludes the frusto-conical surface 222 and the external annular shoulder 224. In several exemplary embodiments, the foregoing male, female, and nut parts are male, female, and nut parts of a Weco® style hammer union.

In an exemplary embodiment, when the pressure relief valve assembly 182 is in the assembled condition shown in FIGS. 10, 11, and 12, at least the portion of the body 188 that excludes the frusto-conical surface 222 and the external annular shoulder 224, forms a female part of a hammer union. This female part of the hammer union is adapted to be connected to a male part of the hammer union via a nut part of the hammer union; this male part of the hammer union includes components that are equivalent to at least the portion of the body 188 that excludes the frusto-conical surface 226 and the external threaded connection 190; and this nut part of the hammer union includes components that are equivalent to the combination of the wing nut 184, the one or more retainer segments 198, and the retainer ring 200. In several exemplary embodiments, the foregoing male, female, and nut parts are male, female, and nut parts of a Weco® style hammer union.

In several exemplary embodiments, the one or more retainer segments 198 and the retainer ring 200 permit the assembly of the pressure relief valve assembly 182 in accordance with the foregoing. More particularly, due to the frusto-conical surface 226, the body 188 is not able to move through the wing nut 184 in a left-to-right direction, as viewed in FIG. 12, so that the external shoulders 210 engage the internal annular shoulder 208. Instead, to assemble the pressure relief valve assembly 182, in several exemplary embodiments, the end portion of the body 188 opposing the frusto-conical surface 226 and the external threaded connection 190 is inserted through the wing nut 184, in a right-to-left direction as viewed in FIG. 12, so that the external annular shoulder 224 moves past the wing nut 184; at this point, the one or more retainer segments 198 are concentrically disposed around the body 188, radially between the body 188 and the wing nut 184, and axially between the external annular shoulder 224 and the internal annular shoulder 208, and the retainer ring 200 is used to hold the one or more retainer segments 198 together. The body 188 is then permitted to move axially, in a left-to-right direction as viewed in FIG. 12, until the respective external annular shoulders 210 of the one or more retainer segments 198 engage the internal annular shoulder 208 of the wing nut 184. The body 188 is also permitted to move axially, in a right-to-left direction as viewed in FIG. 12, until the frusto-conical surface 226 of the body 188 engages the end portion 204 of the wing nut 184.

In operation, in several exemplary embodiments, with continuing reference to FIGS. 1, 10, 11, and 12, the pump assembly 12 (FIG. 1) draws fluid therein and discharges the fluid at a substantially higher pressure. During this operation of the pump assembly 12, the internal fluid passage 214 is in fluid communication with the pump assembly 12, and fluid pressure within the internal fluid passage 214 is exerted on the rupture disc 246 of the pressure relief valve assembly 182 in at least a direction 256, which is indicated by the left-to-right arrow 256 in FIG. 12. The sealing engagement, between the sealing element 242 and the side of the mounting portion 248 that engages the internal annular shoulder 238, prevents, or at least resists, the fluid from flowing through the internal fluid passage 214, around the rupture disc 246, and into the internal fluid passage 232. Moreover, the washer 254 maintains the connection between the retainer nut 186 and the body 188 by preventing, or at least obstructing, the external threaded connection 218 from threadably disengaging the internal threaded connection 244.

During the operation of the pump assembly 12, when the fluid pressure within the internal fluid passage 214 reaches or exceeds a predetermined pressure value, causing a predetermined pressure differential across the rupture disc 246, the rupture portion 250 of the rupture disc 246 ruptures. As a result, the internal fluid passage 232 is in fluid communication with the internal fluid passage 214, and the pressure relief valve assembly 182 permits fluid to flow through the internal fluid passage 214, through the internal fluid passage 252 of the rupture disc 246, and through the internal fluid passage 232. This fluid flow is in the direction 256. This fluid flow reduces or relieves the pressure within the pump assembly 12. As a result, the pressure relief valve assembly 182 operates to relieve the pressure within the pump assembly 12, preventing a further increase in pressure so as to prevent or otherwise substantially reduce the likelihood of damage to the pump assembly 12, one or more other components of the pumping system 10, and/or any system(s) in fluid communication therewith.

During operation, in several exemplary embodiments, after the rupture disc 246 ruptures, the diameter $D_5$ being at least 25% greater than the diameter $D_6$ increases the likelihood that shrapnel from the ruptured rupture disc 246 will flow out of the body 188 without creating a pressure spike.

Figure 13:
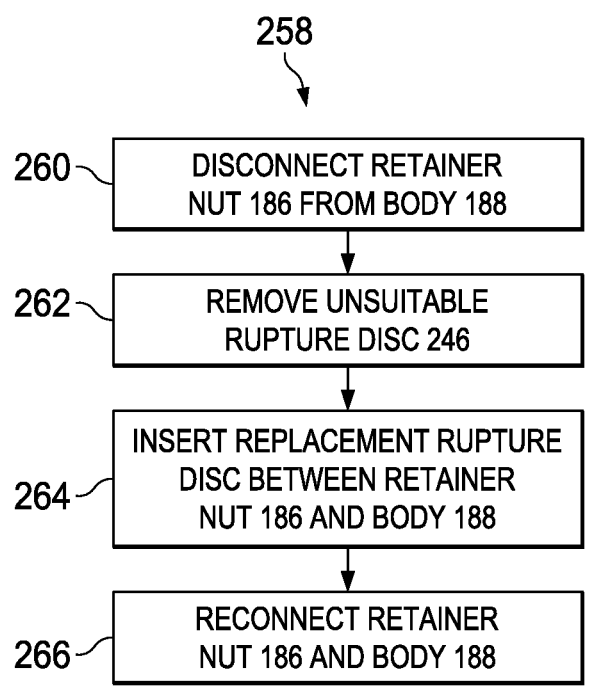
FIG. 13 is a flow chart illustration of a method of retrofitting the pressure relief valve assembly of FIGS. 10-12, according to an exemplary embodiment.

In an exemplary embodiment, as illustrated in FIG. 13 with continuing reference to FIGS. 1, 10, 11, and 12, a method of retrofitting the pressure relief valve assembly 182 is generally referred to by the reference numeral 258. In several exemplary embodiments, the method 258 is executed when the rupture disc 246 is deemed unsuitable. In an exemplary embodiment, the rupture disc 246 is deemed unsuitable after it has ruptured in accordance with the foregoing operation of the pressure relief valve assembly 182. In an exemplary embodiment, the rupture disc 246 is deemed unsuitable after it has been in the field for a predetermined service life.

The method includes a step 260, at which the retainer nut 186 and the body 188 are disconnected from one another. At the step 260, in an exemplary embodiment, the external threaded connection 218 of the retainer nut 186 is threadably disengaged from the internal threaded connection 244 of the body 188. After the step 260, at step 262 the unsuitable rupture disc 246 is removed from the pressure relief valve assembly 182. At step 264, a replacement rupture disc, which is identical to the rupture disc 246, is inserted between the body 188 and the retainer nut 186. At step 266, the body 188 and the retainer nut 186 are re-connected to each other.

In an exemplary embodiment, at the step 266, the replacement rupture disc extends within the counterbore 236, and the annular mounting portion of the replacement rupture disc engages the internal annular shoulder 238 of the body 188. In several exemplary embodiments, the washer 254, or a replacement washer, as the case may be, also extends within the counterbore 236, adjacent the replacement rupture disc. The retainer nut 186 is connected to the body 188 via threaded engagement between the external threaded connection 218 and the internal threaded connection 244. Both the washer 254 and the annular mounting portion of the replacement rupture disc are clamped between the retainer nut 186 and the body 188. The side of the replacement rupture disc opposing the washer 254 engages the internal annular shoulder 238 of the body 188. Moreover, the washer 254 is engaged by the end face 216 of the retainer nut 186 and the side of the replacement rupture disc opposing the internal annular shoulder 238. As a result of the connection between the retainer nut 186 and the body 188, the sealing element 242 sealingly engages the side of the replacement rupture disc that engages the internal annular shoulder 238, and the washer 254 prevents, or at least obstructs, the external threaded connection 218 from threadably disengaging the internal threaded connection 244.

In several exemplary embodiments, as established by the execution of the method 258, the pressure relief valve assembly 182 provides a re-kittable housing. More particularly, after the rupture disc 246 ruptures, the pressure relief valve assembly 182 can be re-used by retrofitting the pressure relief valve assembly 182, that is, by replacing the unsuitable rupture disc 246 with a replacement rupture disc identical thereto. Therefore, the total cost of ownership is reduced because an operator only has to replace the unsuitable rupture disc 246 and does not have to replace the entire pressure relief valve assembly 182, which assembly costs more than a replacement rupture disc that is identical to the rupture disc 246. Thus, the pressure relief valve assembly 182 lowers costs associated with pressure relief efforts.

In several exemplary embodiments, at least the wing nut 184, the one or more retainer segments 198, the retainer ring 200, the end face 220, the frusto-conical surface 222, and the external annular shoulder 224 are omitted from the pressure relief valve assembly 182, in favor of a combination of an external threaded connection, an internal annular shoulder, an annular groove, and an internal seal ring, which axially oppose the frusto-conical surface 226 and the external threaded connection 190, and are similar to the external threaded connection 190, the internal annular shoulder 228, the annular groove 230, and the internal seal ring (not shown), respectively. In such exemplary embodiments, the portion of the body 188 that excludes the frusto-conical surface 226 and the external threaded connection 190 is a female part of a hammer union. This female part of the hammer union is adapted to be connected to a male part of the hammer union via a nut part of the hammer union, as described above.

In several exemplary embodiments, at least the combination of the external threaded connection 190, the internal annular shoulder 228, the annular groove 230, and the internal seal ring (not shown) are omitted from the pressure relief valve assembly 182, in favor of a combination of a wing nut, one or more retainer segments, a retainer ring, an end face, a frusto-conical surface, and an external annular shoulder, which axially oppose the end face 220 and are similar to the wing nut 184, the one or more retainer segments 198, the retainer ring 200, the end face 220, the frusto-conical surface 222, and the external annular shoulder 224, respectively. In such exemplary embodiments, the portion of the body 188 that excludes the frusto-conical surface 222 and the external annular shoulder 224 forms a male part of a hammer union. This male part of the hammer union is adapted to be connected, using a nut part, to a female part of the hammer union, as described above.

In several exemplary embodiments, at least the wing nut 184, the one or more retainer segments 198, the retainer ring 200, the end face 220, the frusto-conical surface 222, and the external annular shoulder 224 are omitted from the pressure relief valve assembly 182, in favor of a combination of an external threaded connection, an internal annular shoulder, an annular groove, and an internal seal ring, which axially oppose the frusto-conical surface 226 and the external threaded connection 190, and are similar to the external threaded connection 190, the internal annular shoulder 228, the annular groove 230, and the internal seal ring (not shown), respectively. Moreover, at least the combination of the external threaded connection 190, the internal annular shoulder 228, the annular groove 230, and the internal seal ring (not shown) are omitted from the pressure relief valve assembly 182, in favor of a combination of a wing nut, one or more retainer segments, a retainer ring, an end face, a frusto-conical surface, and an external annular shoulder, which axially oppose the end face 220 and are similar to the wing nut 184, the one or more retainer segments 198, the retainer ring 200, the end face 220, the frusto-conical surface 222, and the external annular shoulder 224, respectively. The portion of the body 188 that includes the external threaded connection, the internal annular shoulder, the annular groove, and the internal seal ring forms a female part of a hammer union; moreover, the portion of the body 188 that includes the wing nut, the one or more retainer segments, the retainer ring, the end face, the frusto-conical surface, and the external annular shoulder forms a male part of a hammer union.

Figure 14:
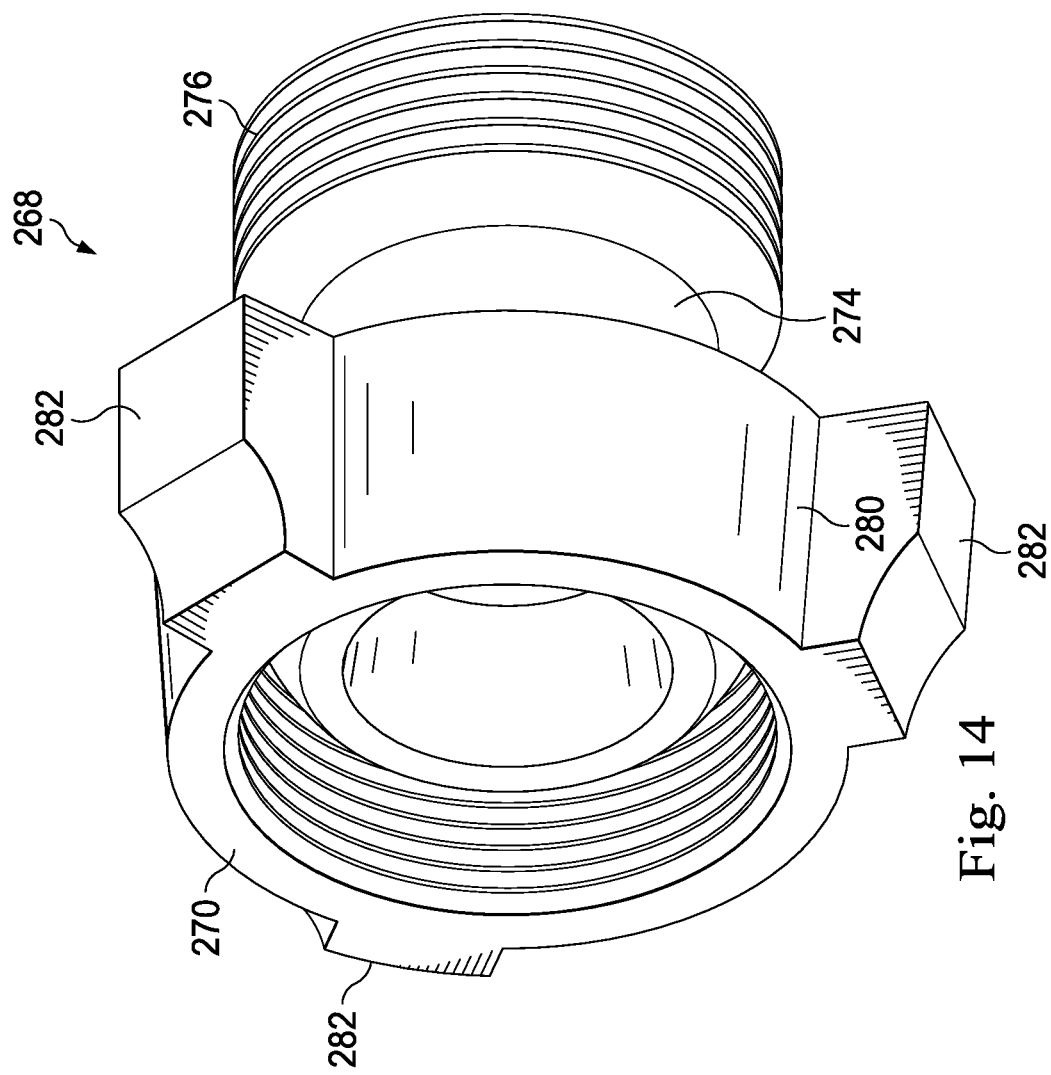
FIG. 14 is a perspective view of a pressure relief valve assembly according to an exemplary embodiment and suitable as a substitute for the pressure relief valve assembly of FIGS. 2-4, FIGS. 6-8, and/or FIGS. 10-12 in the pumping system of FIG. 1.
Figure 15:
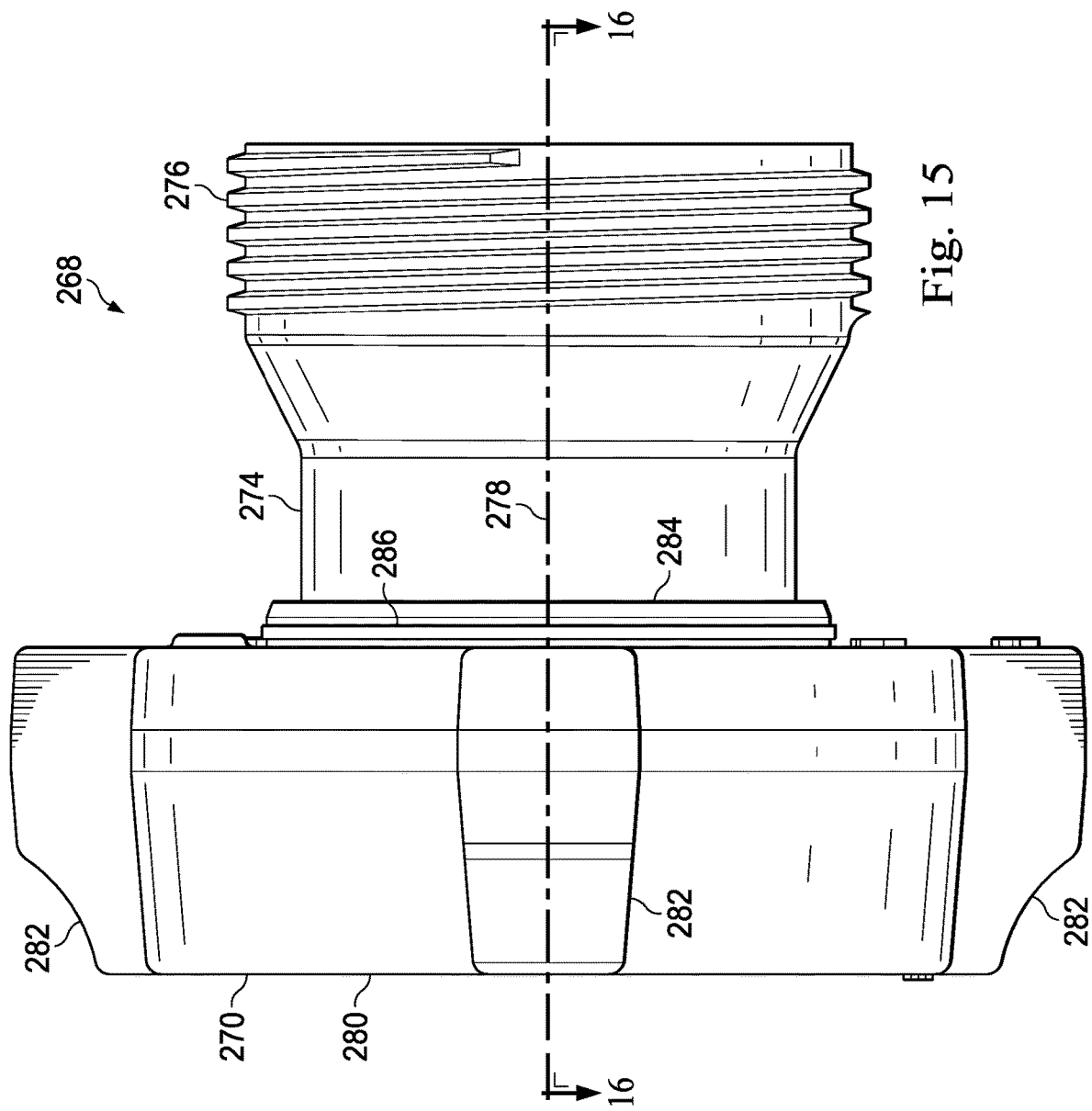
FIG. 15 is a side view of the pressure relief valve assembly of FIG. 14, according to an exemplary embodiment.

In an exemplary embodiment, as illustrated in FIGS. 14 and 15 with continuing reference to FIG. 1, a pressure relief valve assembly is generally referred to by the reference numeral 268. In the pumping system 10, in several exemplary embodiments, the pressure relief valve assemblies 20, 104, and/or 182 are omitted in favor of the pressure relief valve assembly 268. In several exemplary embodiments, the pressure relief valve assembly 268 is a substitute for the pressure relief valve assemblies 20, 104, and/or 182.

As shown in FIGS. 14 and 15, the pressure relief valve assembly 268 includes a wing nut 270, a retainer nut 272 (visible in FIG. 16), and a body 274 including an external threaded connection 276 at one end portion thereof. In several exemplary embodiments, the retainer nut 272 may be referred to as a "first sub," and the body 274 may be referred to as a "second sub." Alternatively, in several exemplary embodiments, the body 274 may be referred to as a "first sub," and the retainer nut 272 may be referred to as a "second sub." A longitudinally-extending center axis 278 is defined by the pressure relief valve assembly 268. The wing nut 270 includes an annular body 280 and a plurality of circumferentially-spaced lugs 282 extending radially outward from the annular body 280.

Figure 16:
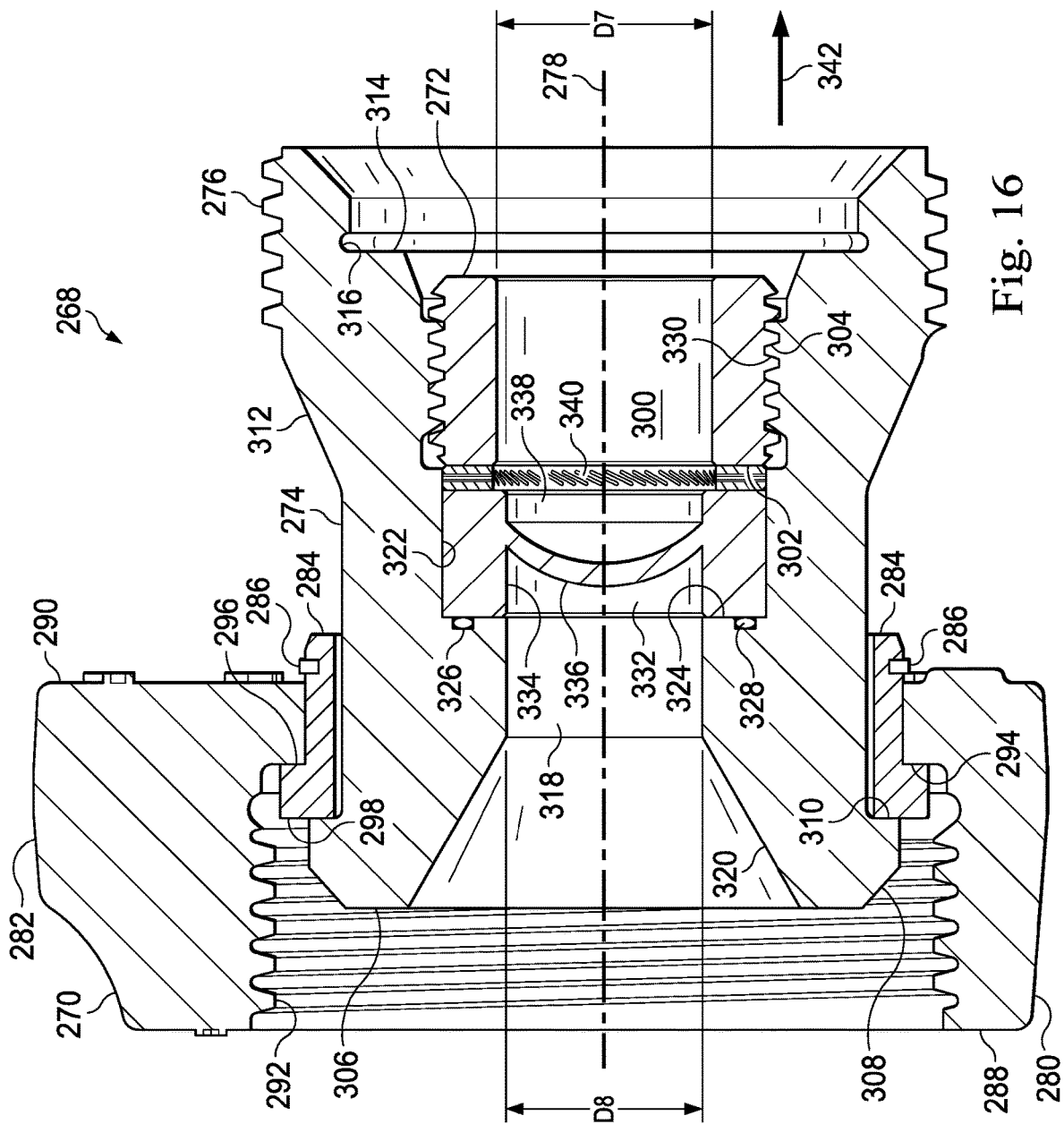
FIG. 16 is a section view of the pressure relief valve assembly of FIGS. 14 and 15 taken along line 16-16 of FIG. 15, according to an exemplary embodiment.

In an exemplary embodiment, as illustrated in FIGS. 15 and 16 with continuing reference to FIGS. 1 and 14, the pressure relief valve assembly 268 further includes one or more circumferentially-extending retainer segments 284 concentrically disposed about the body 274. The one or more retainer segments 284 are held together with a retainer ring 286, which extends circumferentially about the body 274.

In an exemplary embodiment, as illustrated most clearly in FIG. 16, with continuing reference to FIGS. 1, 14, and 15, the annular body 280 of the wing nut 270 includes opposing end portions 288 and 290, and an internal threaded connection 292 formed in the interior of the annular body 280 and adjacent, or at least proximate, the end portion 288. An internal annular shoulder 294 is defined in the interior of the annular body 280 at an axial position between the internal threaded connection 292 and the end portion 290. Each of the one or more retainer segments 284 extend within the wing nut 270 and include respective external shoulders 296, which are axially spaced from the retainer ring 286 and engage the internal annular shoulder 294 of the wing nut 270. Respective end faces 298 are defined by the one or more retainer segments 284, and face axially in a direction away from the retainer ring 286.

The retainer nut 272 defines an internal fluid passage 300 having a diameter D7. In an exemplary embodiment, the diameter D7 is 2.5 inches. The internal fluid passage 300 is substantially coaxial with the center axis 278. The retainer nut 272 also defines an end face 302 at one end thereof. The end face 302 is an axially-facing surface. An external threaded connection 304 is formed in the exterior of the retainer nut 272 and extends between the opposing ends thereof. In several exemplary embodiments, the external threaded connection 304 extends adjacent, or at least proximate, the end face 302 of the retainer nut 272.

The body 274 defines an end face 306 at the end thereof opposing the external threaded connection 276. The end face 306 is an axially-facing surface. A frusto-conical surface 308 of the body 274 extends angularly away from the end face 306. An external annular shoulder 310 is formed in the exterior of the body 274, axially between the frusto-conical surface 308 and the external threaded connection 276. Moreover, a frusto-conical surface 312 is formed in the exterior of the body 274, axially between the external annular shoulder 310 and the external threaded connection 276. An internal annular shoulder 314 is formed in the interior of the body 274 at the end portion opposing the end face 306. The internal annular shoulder 314 is an axially-facing surface. An annular groove 316 is formed in the interior of the body 274, adjacent the internal annular shoulder 314. An internal seal ring (not shown) engages the internal annular shoulder 314, and extends within the annular groove 316.

An internal fluid passage 318 is defined by the body 274. The internal fluid passage 318 is substantially coaxial with the center axis 278. A frusto-conical surface 320 is formed in the interior of the body 274, axially between the end face 306 and the internal fluid passage 318. In several exemplary embodiments, the frusto-conical surface 320 adjoins both the end face 306 and the internal fluid passage 318. A counterbore 322 is formed in the body 274, thereby defining an internal annular shoulder 324 of the body 274. The internal annular shoulder 324 is an axially-facing surface. The internal annular shoulder 324 adjoins the internal fluid passage 318, opposite the frusto-conical surface 320. An annular groove 326 is formed in the internal annular shoulder 324. A sealing element 328, such as an O-ring, extends within the annular groove 326. An internal threaded connection 330 is formed in the interior of the body 274 at the counterbore 322, axially between the internal annular shoulder 324 and the internal annular shoulder 314.

As shown in FIG. 16, the pressure relief valve assembly 268 further includes a rupture disc 332, which is clamped between the retainer nut 272 and the body 274, as will be described in further detail below. The rupture disc 332 includes an annular mounting portion 334 and a domed rupture portion 336 about which the mounting portion 334 circumferentially extends. An internal fluid passage 338 having a diameter D8 is defined by the annular mounting portion 334. The internal fluid passage 338 is substantially coaxial with the center axis 278 and thus with the internal fluid passage 318. The domed rupture portion 336 blocks fluid flow through the internal fluid passage 338 until the domed rupture portion 336 ruptures, as will be discussed in further detail below.

In an exemplary embodiment, as shown in FIG. 16, the diameter D8 is less than the diameter D7. In an exemplary embodiment, the diameter D8 is 2 inches. In an exemplary embodiment, the diameter D7 is 2.5 inches, and the diameter D8 is 2 inches. In an exemplary embodiment, the diameter D7 is at least 25% greater than the diameter D8 (D7 is at least 1.25× of D8). In an exemplary embodiment, the diameter D7 is about 25% to about 50% greater than the diameter D8 (D7 is about 1.25× to about 1.50× of D8). In an exemplary embodiment, the rupture disc 332 is composed of one or more materials, one of which is Inconel Alloy 600 to provide corrosion protection for a variety of corrosive media, as well as excellent low temperature behavior. In an exemplary embodiment, the rupture disc 332 is composed of one or more other materials.

In an exemplary embodiment, when the pressure relief valve assembly 268 is in the assembled condition shown in FIGS. 14, 15, and 16, each of the one or more retainer segments 284 extends within the wing nut 270 and the respective external shoulders 296 engage the internal annular shoulder 294 of the wing nut 270. Thus, the one or more retainer segments 284 are secured to the wing nut 270 by being axially trapped between the retainer ring 286 and the respective engagements between the external shoulders 296 and the internal annular shoulder 294. The external annular shoulder 310 of the body 274 engages, or is adapted to engage, the respective end faces 298 of the one or more retainer segments 284. As a result, the wing nut 270, and the one or more retainer segments 284, are secured to the body 274 by being axially trapped between the frusto-conical surface 312 and the external annular shoulder 310. The wing nut 270, along with the one or more retainer segments 284, are permitted to slide axially along the body 274, but they remain secured to the body 274 due to the axial trapping of the one or more retainer segments 284 between the frusto-conical surface 312 and the external annular shoulder 310.

The rupture disc 332 extends within the counterbore 322. In several exemplary embodiments, a washer 340, such as, for example, a Nord-Lock® washer also extends within the counterbore 322, adjacent the rupture disc 332. The retainer nut 272 is connected to the body 274 via threaded engagement between the external threaded connection 304 and the internal threaded connection 330. Accordingly, both the washer 340 and the annular mounting portion 334 of the rupture disc 332 are clamped between the retainer nut 272 and the body 274. In this position, the rupture disc 332 is located axially between the internal fluid passages 300 and 318. The side of the annular mounting portion 334 opposing the washer 340 engages the internal annular shoulder 324 of the body 274. Moreover, the washer 340 is engaged by the end face 302 of the retainer nut 272 and the side of the annular mounting portion 334 opposing the internal annular shoulder 324. As a result of the connection between the retainer nut 272 and the body 274, the sealing element 328 sealingly engages the side of the annular mounting portion 334 that engages the internal annular shoulder 324, and the washer 340 prevents, or at least obstructs, the external threaded connection 304 from threadably disengaging the internal threaded connection 330.

In an exemplary embodiment, when the pressure relief valve assembly 268 is in the assembled condition shown in FIGS. 14, 15, and 16, at least the portion of the body 274 that excludes the frusto-conical surface 312 and the external threaded connection 276 is a male part of a hammer union, and the combination of the wing nut 270, the one or more retainer segments 284, and the retainer ring 286 form a nut part of the hammer union. This male part of the hammer union is adapted to be connected, using this nut part, to a female part of the hammer union, the female part including components that are equivalent to the seal ring (not shown) and at least the portion of the body 274 that excludes the frusto-conical surface 308 and the external annular shoulder 310. In several exemplary embodiments, the foregoing male, female, and nut parts are male, female, and nut parts of a Weco® style hammer union.

In an exemplary embodiment, when the pressure relief valve assembly 268 is in the assembled condition shown in FIGS. 14, 15, and 16, at least the portion of the body 274 that excludes the frusto-conical surface 308 and the external annular shoulder 310, forms a female part of a hammer union. This female part of the hammer union is adapted to be connected to a male part of the hammer union via a nut part of the hammer union; this male part of the hammer union includes components that are equivalent to at least the portion of the body 274 that excludes the frusto-conical surface 312 and the external threaded connection 276; and this nut part of the hammer union includes components that are equivalent to the combination of the wing nut 270, the one or more retainer segments 284, and the retainer ring 286. In several exemplary embodiments, the foregoing male, female, and nut parts are male, female, and nut parts of a Weco® style hammer union.

In several exemplary embodiments, the one or more retainer segments 284 and the retainer ring 286 permit the assembly of the pressure relief valve assembly 268 in accordance with the foregoing. More particularly, due to the frusto-conical surface 312, the body 274 is not able to move through the wing nut 270 in a left-to-right direction, as viewed in FIG. 16, so that the external shoulders 296 engage the internal annular shoulder 294. Instead, to assemble the pressure relief valve assembly 268, in several exemplary embodiments, the end portion of the body 274 opposing the frusto-conical surface 312 and the external threaded connection 276 is inserted through the wing nut 270, in a right-to-left direction as viewed in FIG. 16, so that the external annular shoulder 310 moves past the wing nut 270; at this point, the one or more retainer segments 284 are concentrically disposed around the body 274, radially between the body 274 and the wing nut 270, and axially between the external annular shoulder 310 and the internal annular shoulder 294, and the retainer ring 286 is used to hold the one or more retainer segments 284 together. The body 274 is then permitted to move axially, in a left-to-right direction as viewed in FIG. 16, until the respective external annular shoulders 296 of the one or more retainer segments 284 engage the internal annular shoulder 294 of the wing nut 270. The body 274 is also permitted to move axially, in a right-to-left direction as viewed in FIG. 16, until the frusto-conical surface 312 of the body 274 engages the end portion 290 of the wing nut 270.

In operation, in several exemplary embodiments, with continuing reference to FIGS. 1, 14, 15, and 16, the pump assembly 12 (FIG. 1) draws fluid therein and discharges the fluid at a substantially higher pressure. During this operation of the pump assembly 12, the internal fluid passage 300 is in fluid communication with the pump assembly 12, and fluid pressure within the internal fluid passage 300 is exerted on the rupture disc 332 of the pressure relief valve assembly 268 in at least a direction 342, which is indicated by the left-to-right arrow 342 in FIG. 16. The sealing engagement, between the sealing element 328 and the side of the mounting portion 334 that engages the internal annular shoulder 324, prevents, or at least resists, the fluid from flowing through the internal fluid passage 300, around the rupture disc 332, and into the internal fluid passage 318. Moreover, the washer 340 maintains the connection between the retainer nut 272 and the body 274 by preventing, or at least obstructing, the external threaded connection 304 from threadably disengaging the internal threaded connection 330.

During the operation of the pump assembly 12, when the fluid pressure within the internal fluid passage 300 reaches or exceeds a predetermined pressure value, causing a predetermined pressure differential across the rupture disc 332, the rupture portion 336 of the rupture disc 332 ruptures. As a result, the internal fluid passage 318 is in fluid communication with the internal fluid passage 300, and the pressure relief valve assembly 268 permits fluid to flow through the internal fluid passage 300, through the internal fluid passage 338 of the rupture disc 332, and through the internal fluid passage 318. This fluid flow is in the direction 342. This fluid flow reduces or relieves the pressure within the pump assembly 12. As a result, the pressure relief valve assembly 268 operates to relieve the pressure within the pump assembly 12, preventing a further increase in pressure so as to prevent or otherwise substantially reduce the likelihood of damage to the pump assembly 12, one or more other components of the pumping system 10, and/or any system(s) in fluid communication therewith.

During operation, in several exemplary embodiments, after the rupture disc 332 ruptures, the diameter D7 being at least 25% greater than the diameter D8 increases the likelihood that shrapnel from the ruptured rupture disc 332 will flow out of the body 274 without creating a pressure spike.

Figure 17:
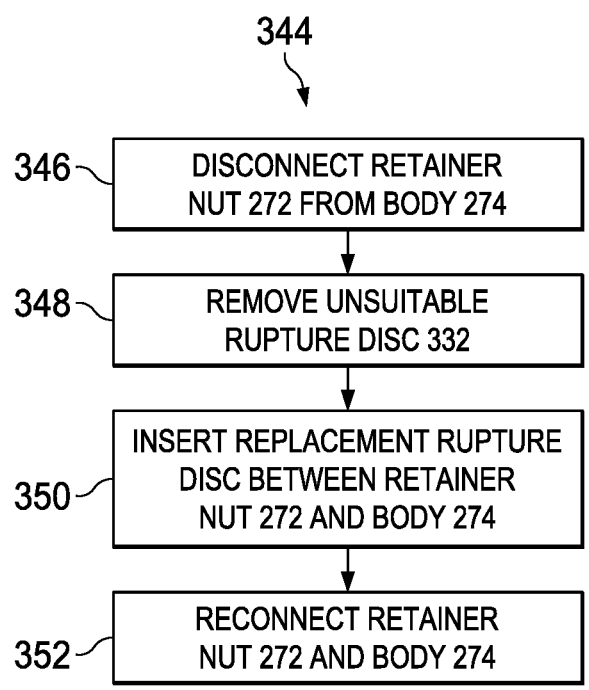
FIG. 17 is a flow chart illustration of a method of retrofitting the pressure relief valve assembly of FIGS. 14-16, according to an exemplary embodiment.

In an exemplary embodiment, as illustrated in FIG. 17 with continuing reference to FIGS. 1, 14, 15, and 16, a method of retrofitting the pressure relief valve assembly 268 is generally referred to by the reference numeral 344. In several exemplary embodiments, the method 344 is executed when the rupture disc 332 is deemed unsuitable. In an exemplary embodiment, the rupture disc 332 is deemed unsuitable after it has ruptured in accordance with the foregoing operation of the pressure relief valve assembly 268. In an exemplary embodiment, the rupture disc 332 is deemed unsuitable after it has been in the field for a predetermined service life.

The method includes a step 346, at which the retainer nut 272 and the body 274 are disconnected from one another. At the step 346, in an exemplary embodiment, the external threaded connection 304 of the retainer nut 272 is threadably disengaged from the internal threaded connection 330 of the body 274. After the step 346, at step 348 the unsuitable rupture disc 332 is removed from the pressure relief valve assembly 268. At step 350, a replacement rupture disc, which is identical to the rupture disc 332, is inserted between the body 274 and the retainer nut 272. At step 352, the body 274 and the retainer nut 272 are re-connected to each other.

In an exemplary embodiment, at the step 352, the replacement rupture disc extends within the counterbore 322, and the annular mounting portion of the replacement rupture disc engages the internal annular shoulder 324 of the body 274. In several exemplary embodiments, the washer 340, or a replacement washer, as the case may be, also extends within the counterbore 322, adjacent the replacement rupture disc. The retainer nut 272 is connected to the body 274 via threaded engagement between the external threaded connection 304 and the internal threaded connection 330. Both the washer 340 and the annular mounting portion of the replacement rupture disc are clamped between the retainer nut 272 and the body 274. The side of the replacement rupture disc opposing the washer 340 engages the internal annular shoulder 324 of the body 274. Moreover, the washer 340 is engaged by the end face 302 of the retainer nut 272 and the side of the replacement rupture disc opposing the internal annular shoulder 324. As a result of the connection between the retainer nut 272 and the body 274, the sealing element 328 sealingly engages the side of the replacement rupture disc that engages the internal annular shoulder 324, and the washer 340 prevents, or at least obstructs, the external threaded connection 304 from threadably disengaging the internal threaded connection 330.

In several exemplary embodiments, as established by the execution of the method 344, the pressure relief valve assembly 268 provides a re-kittable housing. More particularly, after the rupture disc 332 ruptures, the pressure relief valve assembly 268 can be re-used by retrofitting the pressure relief valve assembly 268, that is, by replacing the unsuitable rupture disc 332 with a replacement rupture disc identical thereto. Therefore, the total cost of ownership is reduced because an operator only has to replace the unsuitable rupture disc 332 and does not have to replace the entire pressure relief valve assembly 268, which assembly costs more than a replacement rupture disc that is identical to the rupture disc 332. Thus, the pressure relief valve assembly 268 lowers costs associated with pressure relief efforts.

In several exemplary embodiments, at least the wing nut 270, the one or more retainer segments 284, the retainer ring 286, the end face 306, the frusto-conical surface 308, and the external annular shoulder 310 are omitted from the pressure relief valve assembly 268, in favor of a combination of an external threaded connection, an internal annular shoulder, an annular groove, and an internal seal ring, which axially oppose the frusto-conical surface 312 and the external threaded connection 276, and are similar to the external threaded connection 276, the internal annular shoulder 314, the annular groove 316, and the internal seal ring (not shown), respectively. In such exemplary embodiments, the portion of the body 274 that excludes the frusto-conical surface 312 and the external threaded connection 276 is a female part of a hammer union. This female part of the hammer union is adapted to be connected to a male part of the hammer union via a nut part of the hammer union, as described above.

In several exemplary embodiments, at least the combination of the external threaded connection 276, the internal annular shoulder 314, the annular groove 316, and the internal seal ring (not shown) are omitted from the pressure relief valve assembly 268, in favor of a combination of a wing nut, one or more retainer segments, a retainer ring, an end face, a frusto-conical surface, and an external annular shoulder, which axially oppose the end face 306 and are similar to the wing nut 270, the one or more retainer segments 284, the retainer ring 286, the end face 306, the frusto-conical surface 308, and the external annular shoulder 310, respectively. In such exemplary embodiments, the portion of the body 274 that excludes the frusto-conical surface 308 and the external annular shoulder 310 forms a male part of a hammer union. This male part of the hammer union is adapted to be connected, using a nut part, to a female part of the hammer union, as described above.

In several exemplary embodiments, at least the wing nut 270, the one or more retainer segments 284, the retainer ring 286, the end face 306, the frusto-conical surface 308, and the external annular shoulder 310 are omitted from the pressure relief valve assembly 268, in favor of a combination of an external threaded connection, an internal annular shoulder, an annular groove, and an internal seal ring, which axially oppose the frusto-conical surface 312 and the external threaded connection 276, and are similar to the external threaded connection 276, the internal annular shoulder 314, the annular groove 316, and the internal seal ring (not shown), respectively. Moreover, at least the combination of the external threaded connection 276, the internal annular shoulder 314, the annular groove 316, and the internal seal ring (not shown) are omitted from the pressure relief valve assembly 268, in favor of a combination of a wing nut, one or more retainer segments, a retainer ring, an end face, a frusto-conical surface, and an external annular shoulder, which axially oppose the end face 306 and are similar to the wing nut 270, the one or more retainer segments 284, the retainer ring 286, the end face 306, the frusto-conical surface 308, and the external annular shoulder 310, respectively. The portion of the body 274 that includes the external threaded connection, the internal annular shoulder, the annular groove, and the internal seal ring forms a female part of a hammer union; moreover, the portion of the body 274 that includes the wing nut, the one or more retainer segments, the retainer ring, the end face, the frusto-conical surface, and the external annular shoulder forms a male part of a hammer union.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A pressure relief valve assembly defining a longitudinally-extending center axis, the pressure relief valve assembly comprising:
   a female sub defining a first internal fluid passage, the first internal fluid passage being generally coaxial with the center axis, the female sub comprising a counterbore, a first internal annular shoulder defined by the counterbore, and an internal threaded connection formed in an interior of the female sub at the counterbore;
   a male sub coupled to the female sub and defining a second internal fluid passage, the second internal fluid passage being generally coaxial with the center axis and thus with the first internal fluid passage, the male sub comprising a first external threaded connection formed in an exterior surface of the male sub threadably coupled to an internal threaded connection formed in an interior surface of the female sub, wherein the male sub is entirely housed within the female sub; and
   a rupture disc clamped between the male sub and the first internal annular shoulder of the female sub so that the rupture disc is positioned axially between the first and second internal fluid passages, the rupture disc being adapted to rupture when a pressure in the second internal fluid passage exceeds a pressure in the first internal fluid passage by a predetermined pressure differential, so that the second internal fluid passage communicates fluid into the first internal fluid passage;
   wherein the first external threaded connection of the male sub is threadably engaged with the internal threaded connection of the female sub to connect the male sub to the female sub and clamp the rupture disc between the male sub and the female sub; and
   wherein the first internal fluid passage of the female sub adjacent the rupture disc comprises a frusto-conical segment flaring radially outward from the first internal fluid passage, and diameters of the frusto-conical segment being substantially greater than a diameter of the first internal fluid passage to increase a likelihood that shrapnel from the ruptured rupture disc will flow out of the female sub.

2. The pressure relief valve assembly of claim 1, wherein the pressure relief valve assembly further comprises a first annular groove formed in the first internal annular shoulder, and a sealing element extending within the first annular groove and sealingly engaging the rupture disc.

3. The pressure relief valve assembly of claim 1, wherein the male sub further comprises an end face and a frusto-conical surface extending angularly from the end face.

4. The pressure relief valve assembly of claim 1, wherein the rupture disc defines a third internal fluid passage through which the first and second fluid passages are in fluid communication when the rupture disc ruptures;
   wherein the first, second, and third internal fluid passages define first, second, and third internal diameters, respectively; and
   wherein the third internal diameter is smaller than at least one of the first and second internal diameters to increase a likelihood that shrapnel from the ruptured rupture disc will flow out of the valve assembly.

5. The pressure relief valve assembly of claim 4, wherein at least one of the first and second internal diameters is at least 25% greater than the third internal diameter.

6. The pressure relief valve assembly of claim 4, wherein at least one of the first and second internal diameters is about 25% to about 50% greater than the third internal diameter.

7. The pressure relief valve assembly of claim 1,
   wherein the pressure relief valve assembly further comprises a washer disposed between the male sub and the rupture disc within the counterbore so that both the washer and the rupture disc are clamped between the male sub and the female sub; and
   wherein the washer is configured to resist loosening of the threaded engagement between the first external threaded connection of the male sub and the internal threaded connection of the female sub.

* * * * *